US00RE45612E

(19) United States
(12) Reissued Patent
Sinko

(10) Patent Number: US RE45,612 E
(45) Date of Reissued Patent: *Jul. 14, 2015

(54) CORROSION INHIBITOR COMPOSITION APPLICABLE FOR ALUMINUM AND STEEL PROTECTION AND PROCEDURE

(75) Inventor: John Sinko, Broomfield, CO (US)

(73) Assignee: MD FIFTH WARD PROPERTIES, INC., Milwaukee, WI (US)

( * ) Notice: This patent is subject to a terminal disclaimer.

(21) Appl. No.: 13/324,441

(22) Filed: Dec. 13, 2011

Related U.S. Patent Documents

Reissue of:
(64) Patent No.: 7,662,241
Issued: Feb. 16, 2010
Appl. No.: 10/784,541
Filed: Feb. 23, 2004

U.S. Applications:
(63) Continuation-in-part of application No. 10/138,794, filed on May 3, 2002, now abandoned.

(60) Provisional application No. 60/288,895, filed on May 4, 2001.

(51) Int. Cl.
*C23C 22/48* (2006.01)
*C23C 22/56* (2006.01)
*C23C 22/00* (2006.01)

(52) U.S. Cl.
CPC ..... *C23C 22/48* (2013.01); *C23C 22/00* (2013.01)

(58) Field of Classification Search
USPC ..... 148/240, 243, 271, 274, 275, 283, 285; 106/14.05, 14.11, 14.13, 14.43, 14.44
See application file for complete search history.

(56) References Cited

U.S. PATENT DOCUMENTS 4,306,988 A 12/1981 Rothgery
4,329,381 A 5/1982 Eschwey et al.
(Continued)

FOREIGN PATENT DOCUMENTS

WO WO 97/25274 7/1997
WO WO99/18044 * 1/1999 ..... C04B 14/36
WO WO 99/18044 4/1999

OTHER PUBLICATIONS

"Challenges of Chromate Inhibitor Pigments Replacement in Organic Coatings" John Sinko May 1, 2001, 2001 Elsevier Science B.V., pp. 267-282, in U.S. Appl. No. 10/138,794.

*Primary Examiner* — Lois Zheng
(74) *Attorney, Agent, or Firm* — Ryan Kromholz & Manion, S.C.

(57) ABSTRACT

A corrosion-inhibiting composition for application to a metal substrate, such as aluminum or steel, and in connection with a paint, and the synthesis of the composition. The active inhibitor constituent of the composition can be selected from the group consisting of 2,5-dimercapto-1,3,4 thiadiazole (DMTD), 2,4-dimercapto-s-triazolo-[4,3-b]-1,3-4-thiadiazole, trithiocyanuric acid (TMT), and derivatives of DMTD and TMT, including various N— or S— and N, N—, S— and N—,S-substituted derivatives of DMTD, including salts of DMTD of the general formula: $M(DMTD)_n$, where n=1,2 or 3, and M is a metal cation and preferably M=Zn(II), Bi(III), Co(II), Ni(II), Cd(II), Pb(II), Ag(I), Sb(III), Cu(II), Li(I), Ca(II), Sr(II), Mg(II), La(III), Ce(III), Pr(III), Al(III) or Zr(IV). DMTD, TMT, and their derivatives may also be combined with phosphates, molybdates, borates, silicates, tungstates, phosphotungstates, phosphomolybdates, cyanamides, carbonates, $SiO_2$ and mixtures thereof.

13 Claims, 13 Drawing Sheets

IR Spectrum of Zn-DMTD, 1:2, according to Example 1.

(56) References Cited

U.S. PATENT DOCUMENTS

| | | | | | |
|---|---|---|---|---|---|
| 4,349,458 | A | | 9/1982 | Rothgery | |
| 4,497,719 | A | * | 2/1985 | King et al. | 508/210 |
| 4,623,474 | A | | 11/1986 | Holstedt et al. | |
| 4,707,405 | A | | 11/1987 | Evans et al. | |
| 5,008,153 | A | | 4/1991 | Hayes | |
| 5,035,720 | A | | 7/1991 | Weers | |
| 5,110,494 | A | | 5/1992 | Beck | |
| 5,171,861 | A | | 12/1992 | Ernhoffer et al. | 508/231 |
| 5,176,894 | A | | 1/1993 | Sinko | |
| 5,314,532 | A | | 5/1994 | Hughes et al. | |
| 5,378,446 | A | | 1/1995 | Sinko | |
| 5,487,779 | A | | 1/1996 | Sinko | |
| 5,558,706 | A | | 9/1996 | Sinko | |
| 5,846,342 | A | | 12/1998 | Aoyama et al. | |
| 5,948,147 | A | | 9/1999 | Sinko | |
| 6,139,610 | A | | 10/2000 | Sinko | 106/14.44 |
| 2002/0197468 | A1 | * | 12/2002 | Sinko | 428/336 |
| 2004/0035498 | A1 | * | 2/2004 | Kinlen | 148/250 |

* cited by examiner

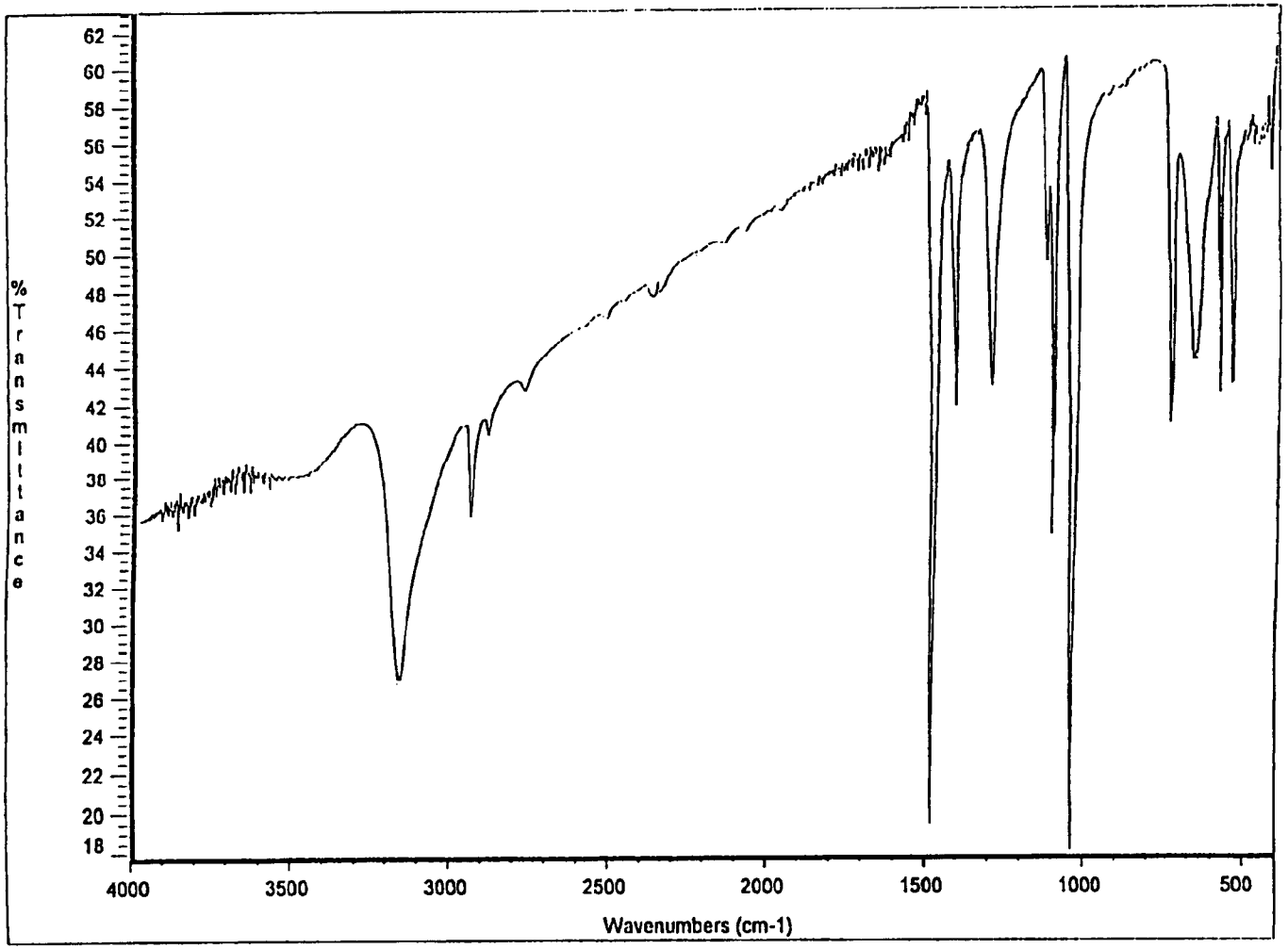
FIG. 1. IR Spectrum of Zn-DMTD, 1:2, according to Example 1.

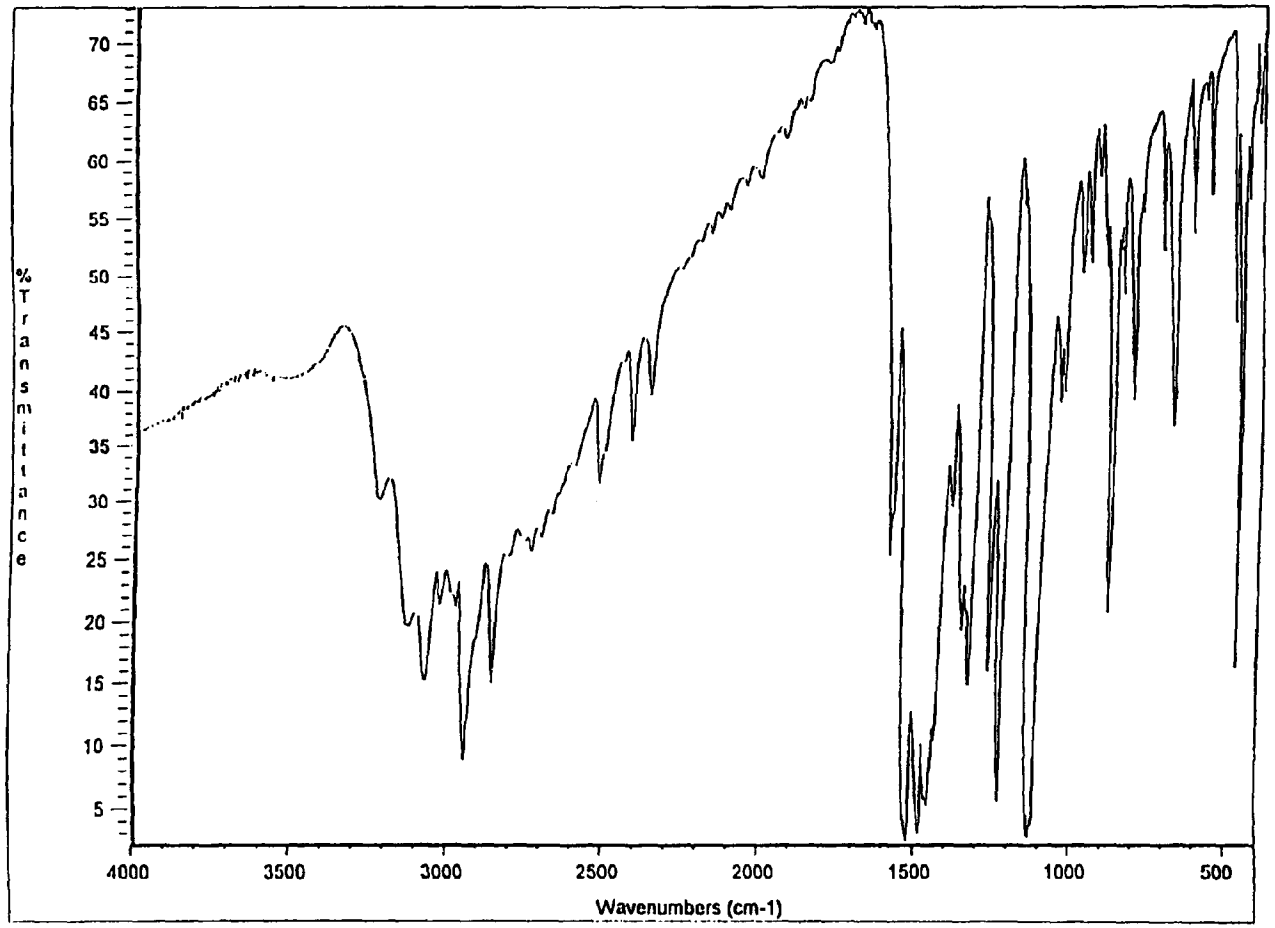
FIG. 2. IR Spectrum of Di-cyclohexylamine-Trithiocyanuric Acid, 1:1 Salt, according to Example 7.

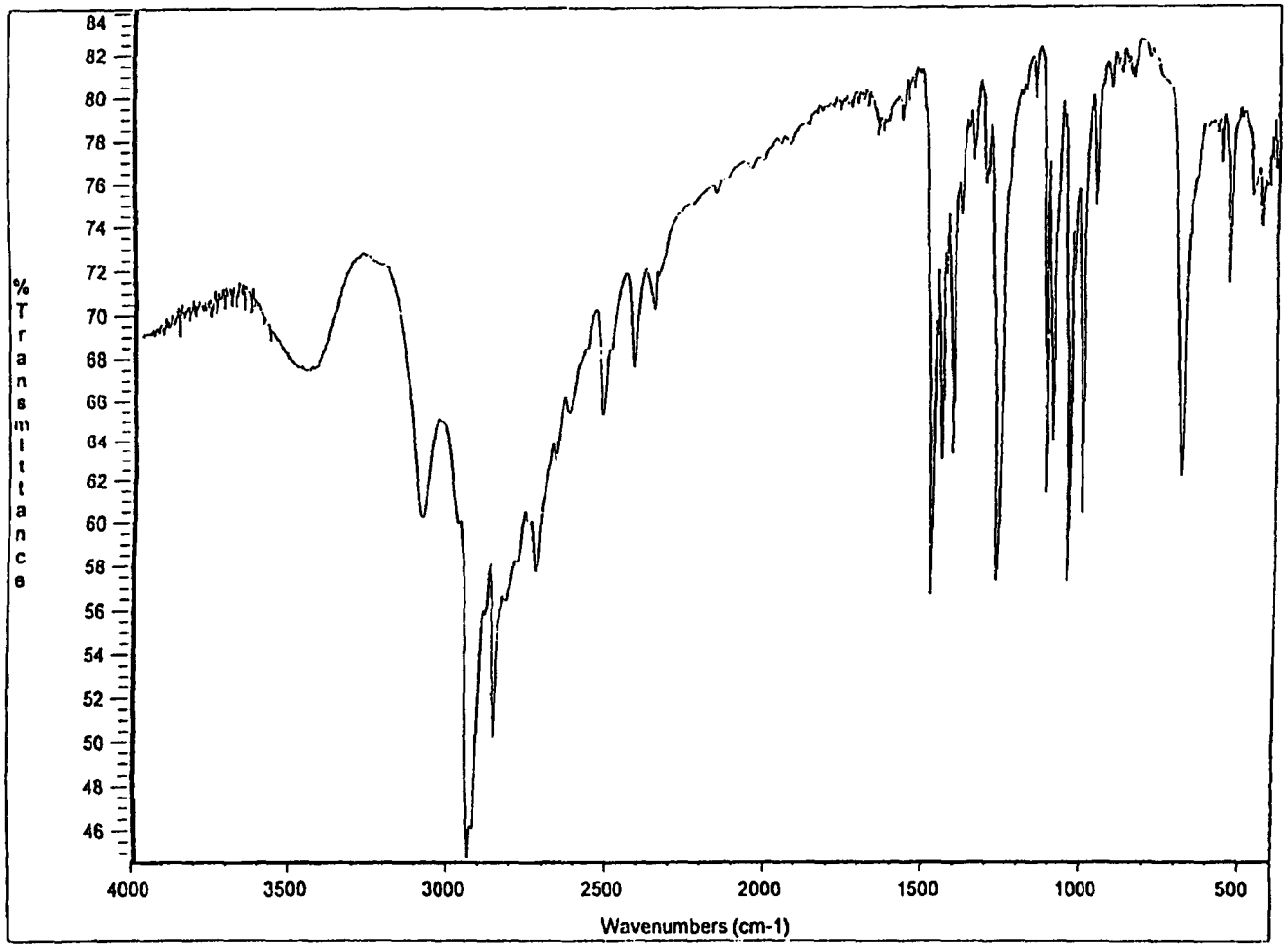
FIG. 3. IR Spectrum of Di-cyclohexylamine-DMD, 1:1 Salt, according to Example 8.

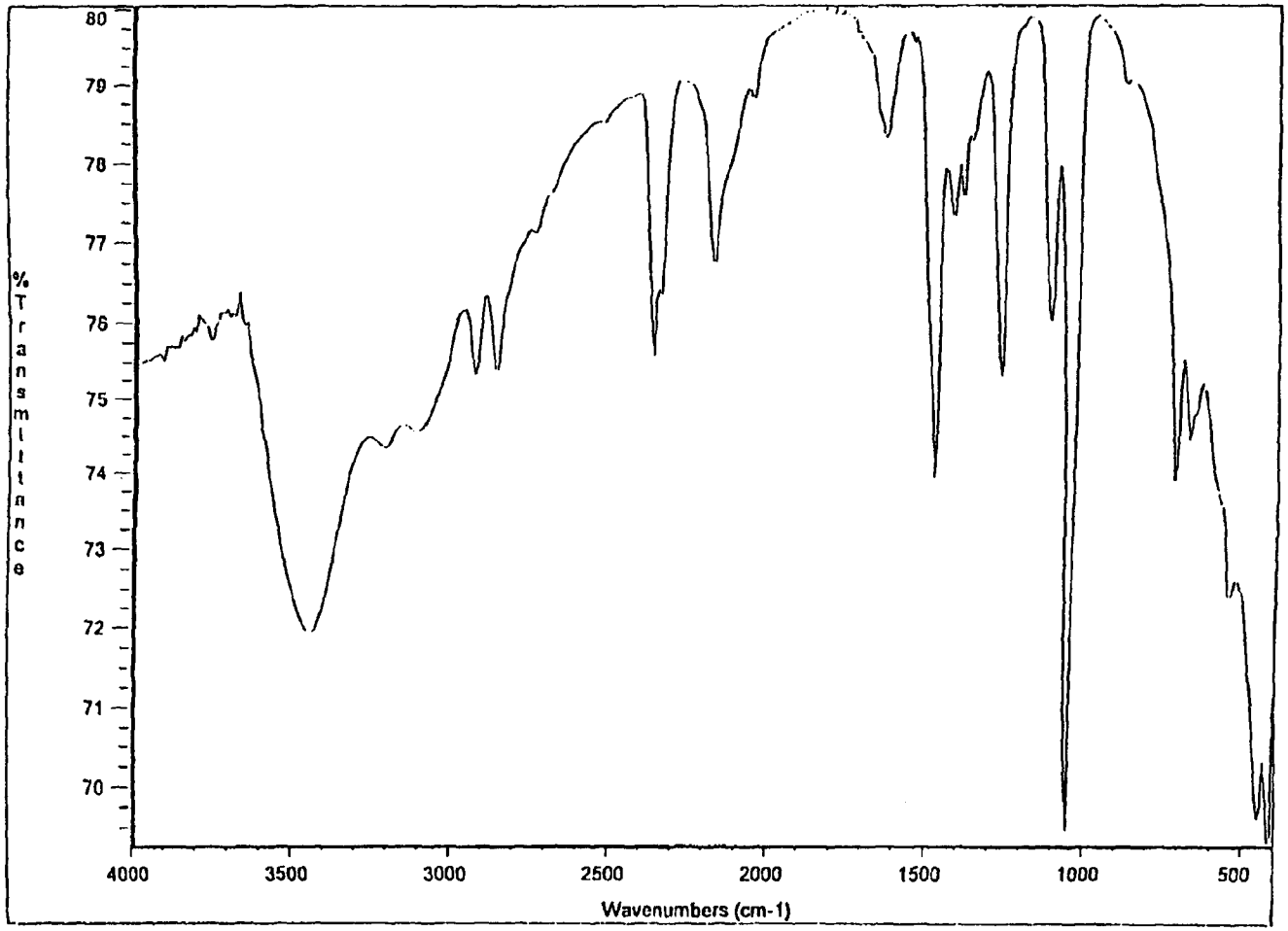
FIG. 4. IR Spectrum of Bi-DMD, 1:1 Salt, according to Example 9.

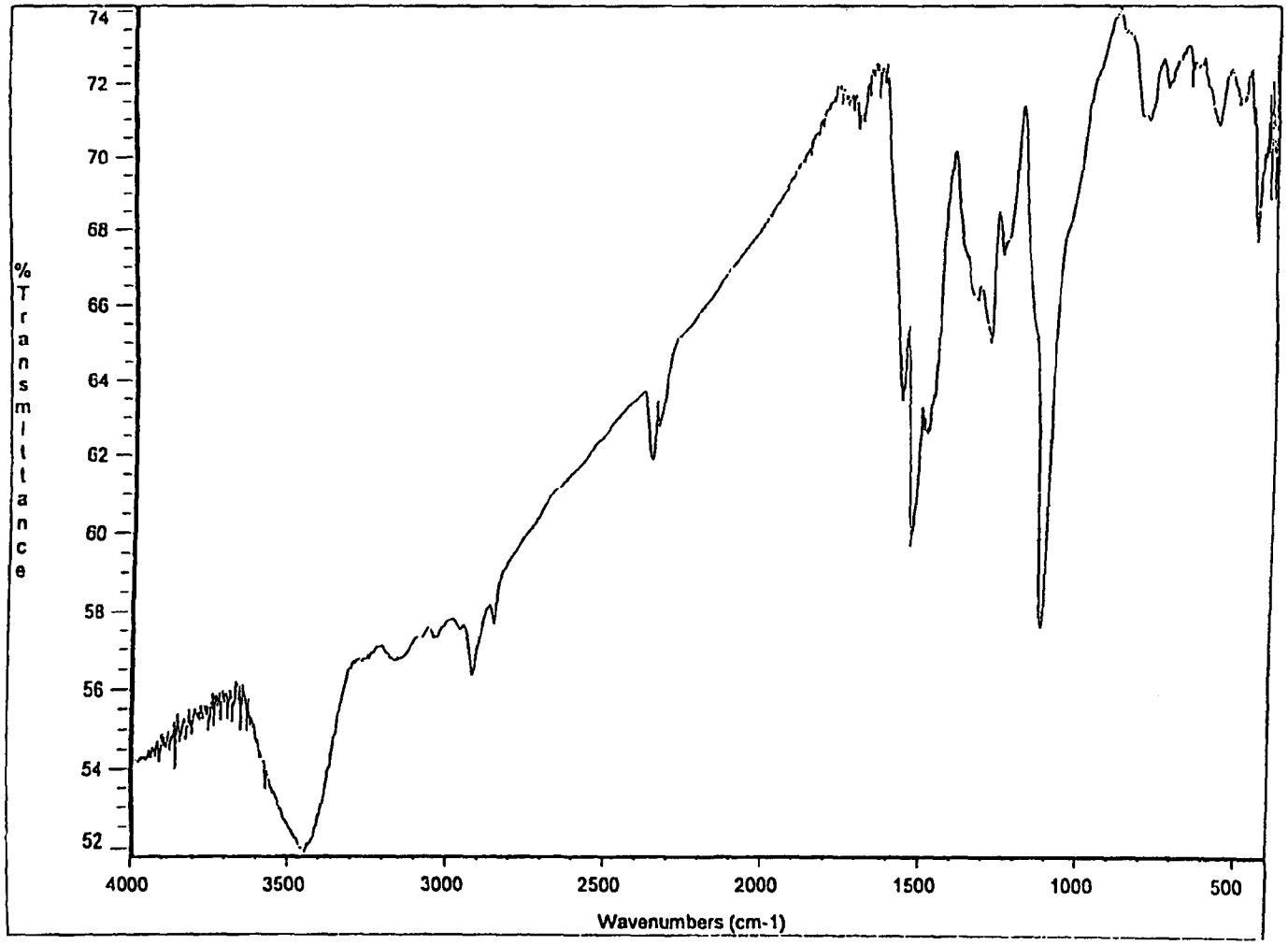
FIG. 5. IR Spectrum of Aniline/Trithiocyanuric Acid micro-composite, according to Example 10.

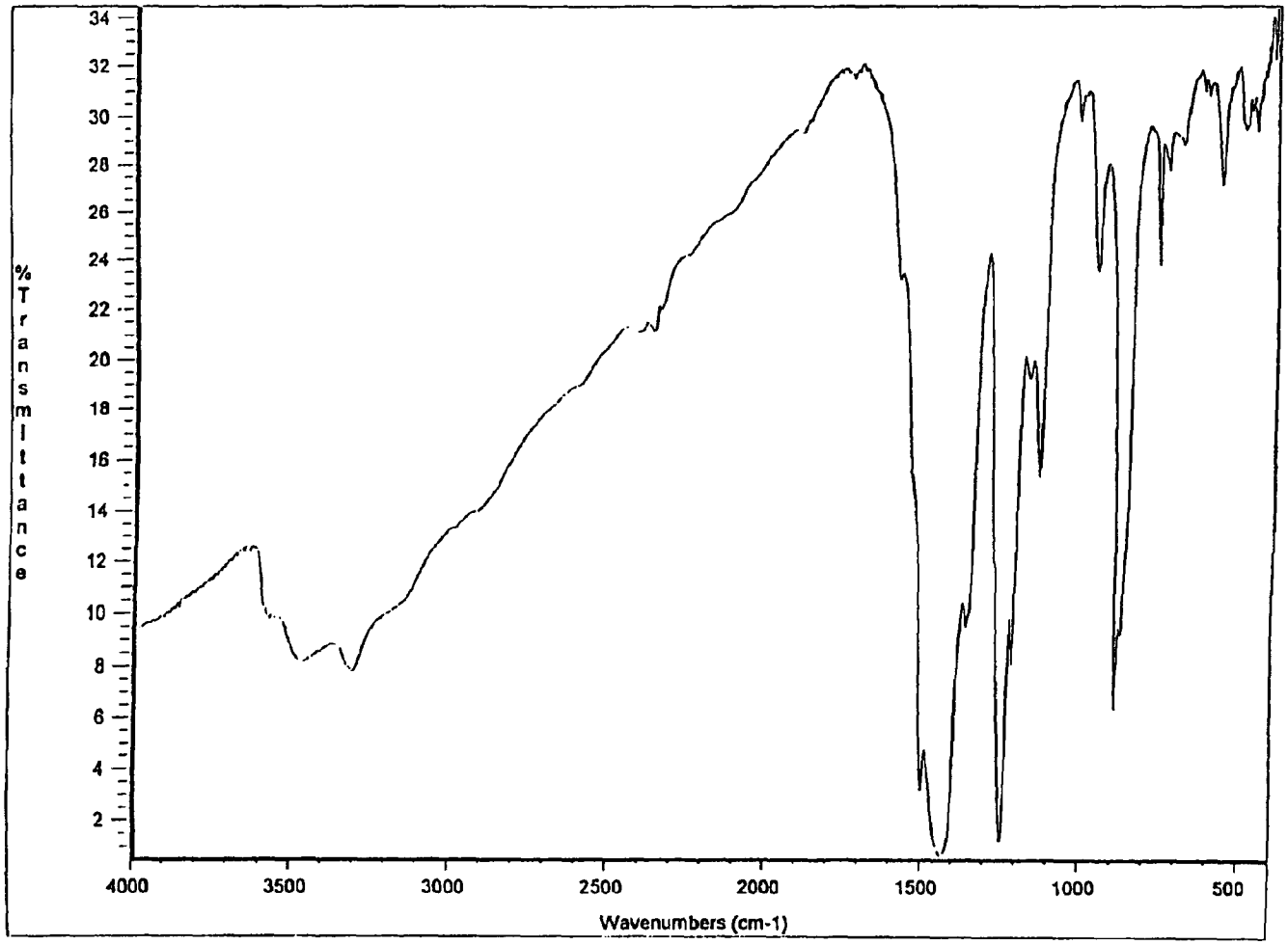
FIG. 6. IR Spectrum of Zn-Trithiocyanuric Acid, 1:1 Salt, according to Example 11.

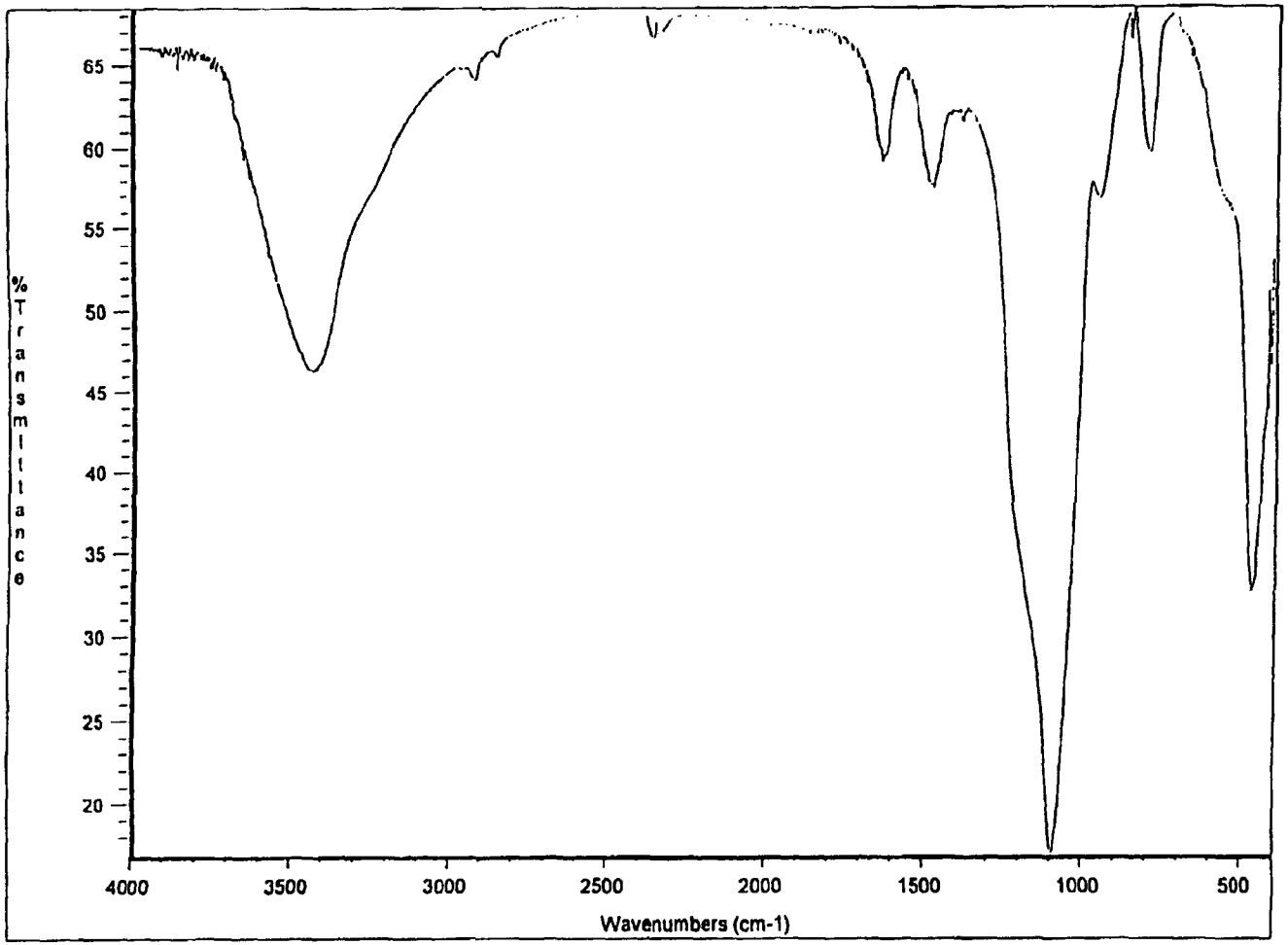
FIG. 7. IR Spectrum of Sr-doped Amorphous Silica according to Example 13.

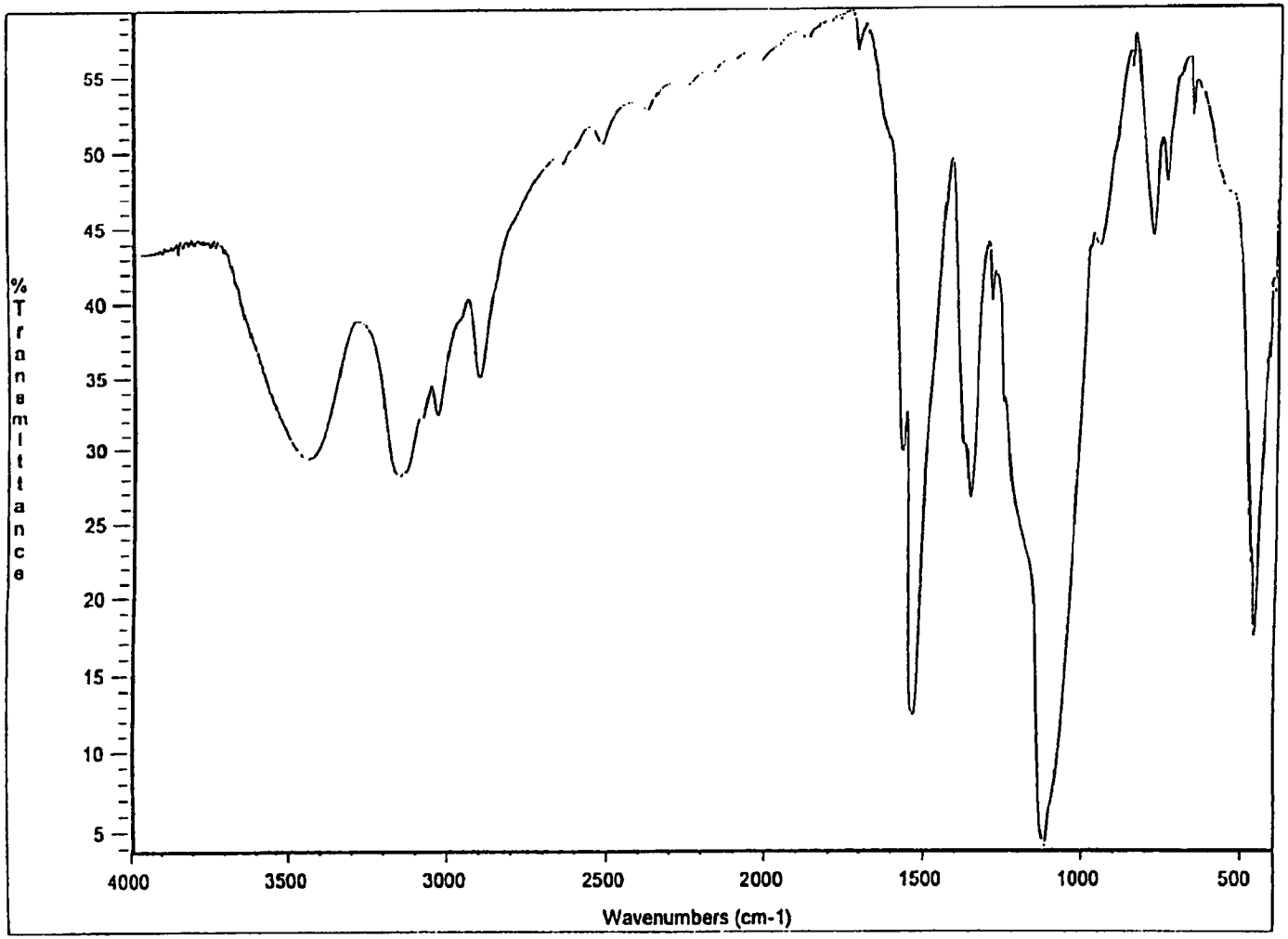
FIG. 8. IR Spectrum of Trithiocyanuric Acid + Sr-doped Amorphous Silica pigment grade mixture according to Example 14.

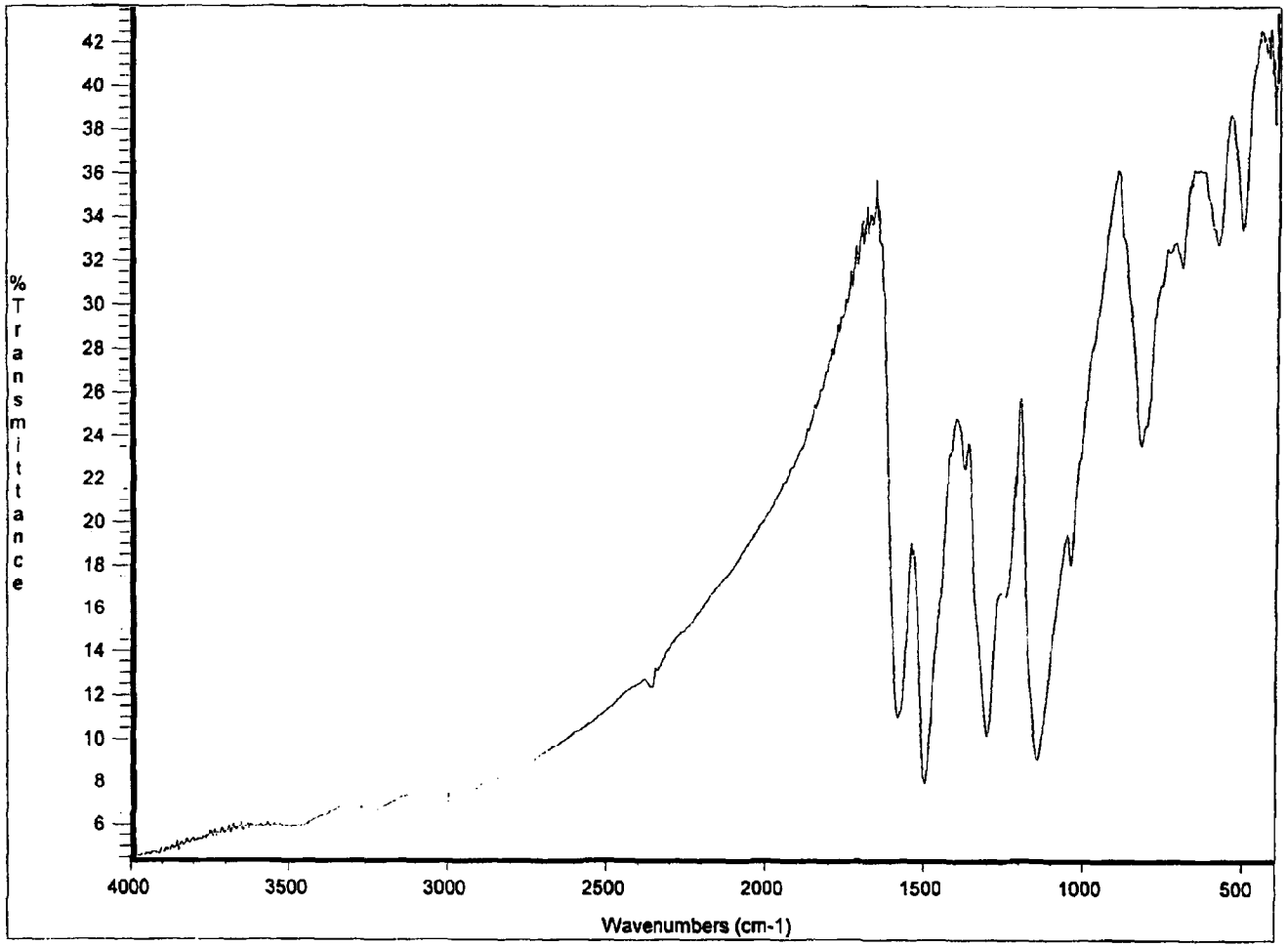
Fig. 9 IR-Spectrum of (PANI)-(H3PO4) according to Example 18.

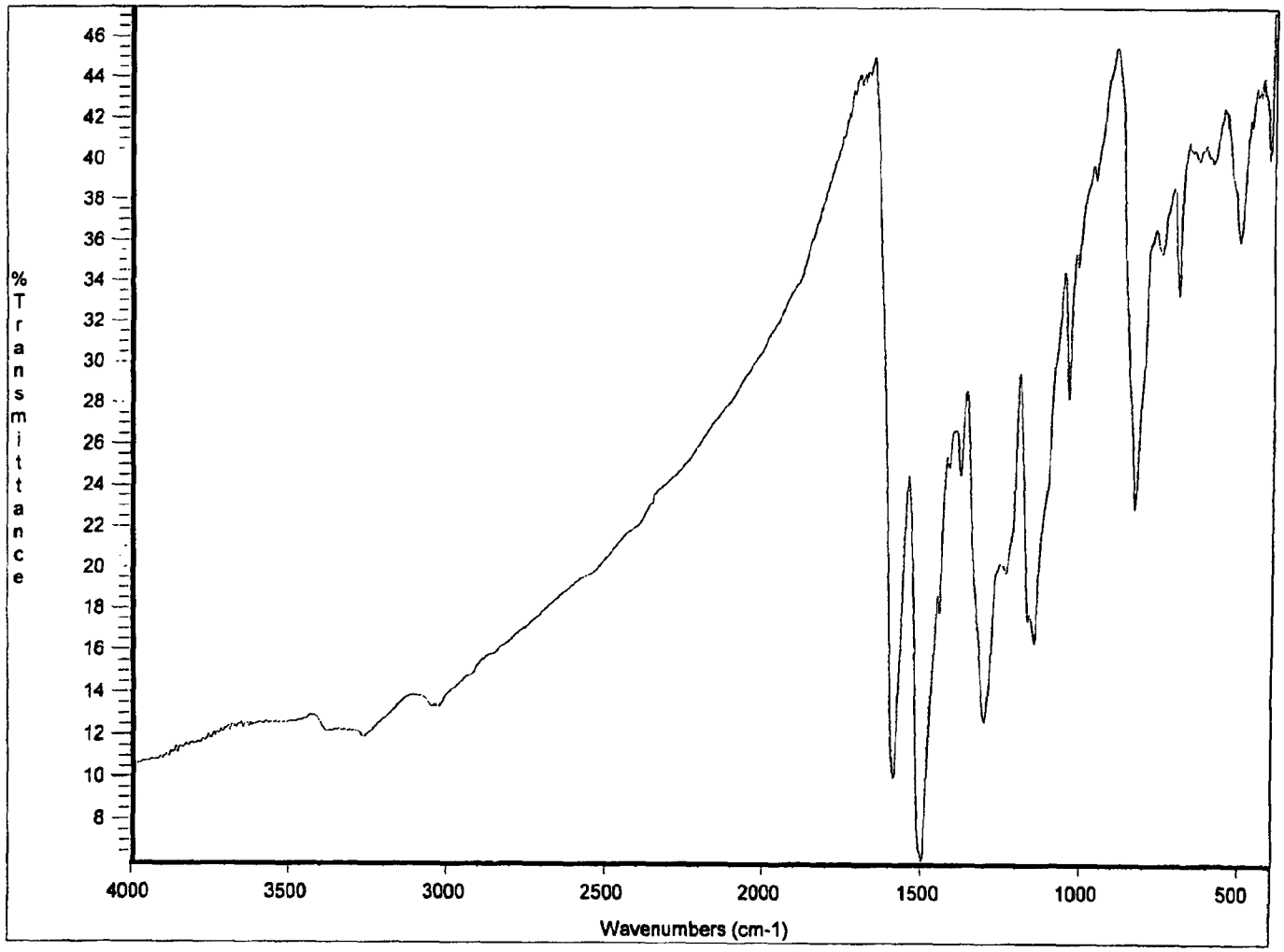
Fig. 10 IR-Spectrum of Deprotonated PANI according to Example 19.

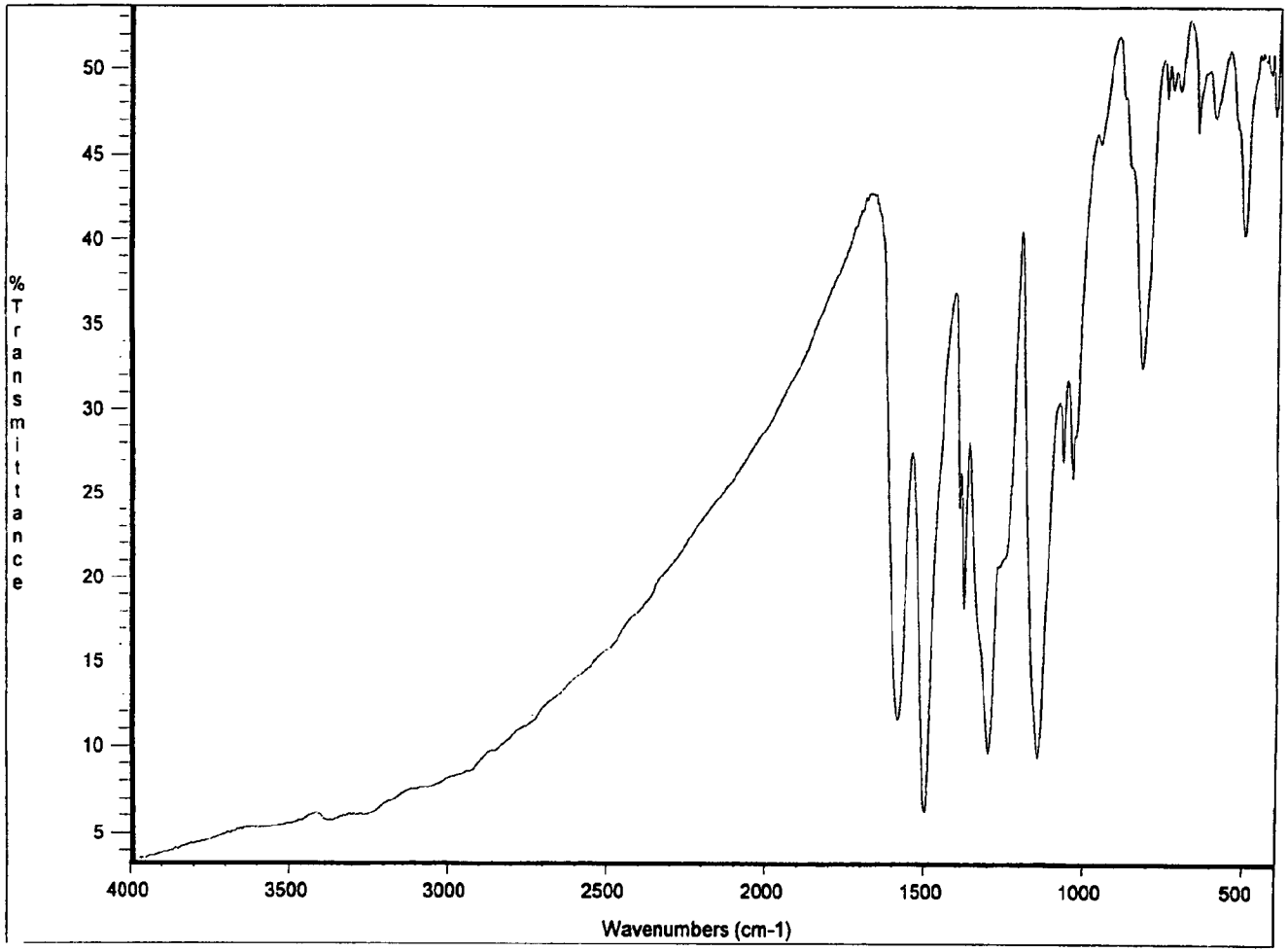
Fig. 11 IR-Spectrum of (PANI)-(DMTD) according to Example 20

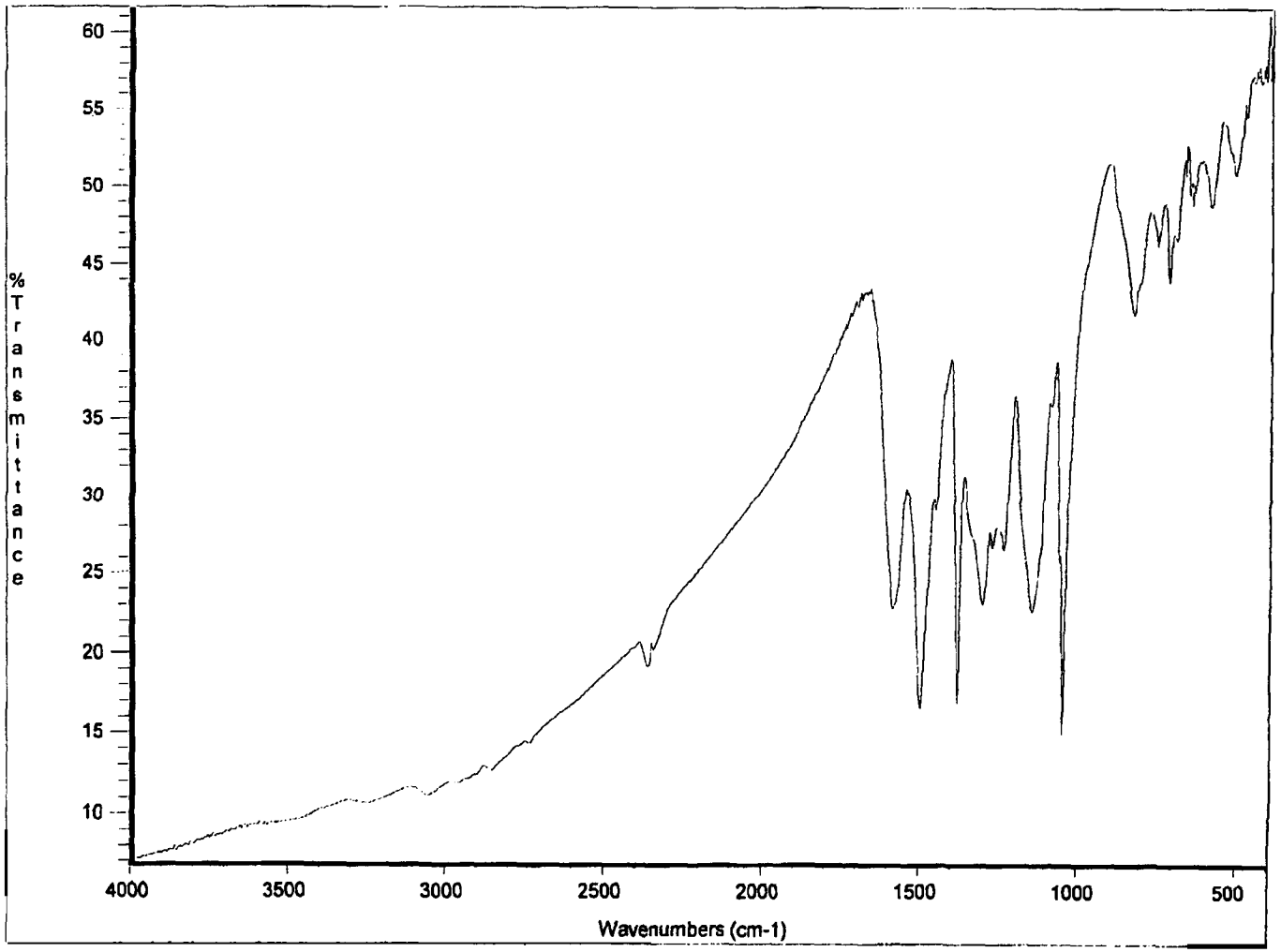
Fig. 12 IR-Spectrum of (PANI)-(DMTD)2 according to Example 21

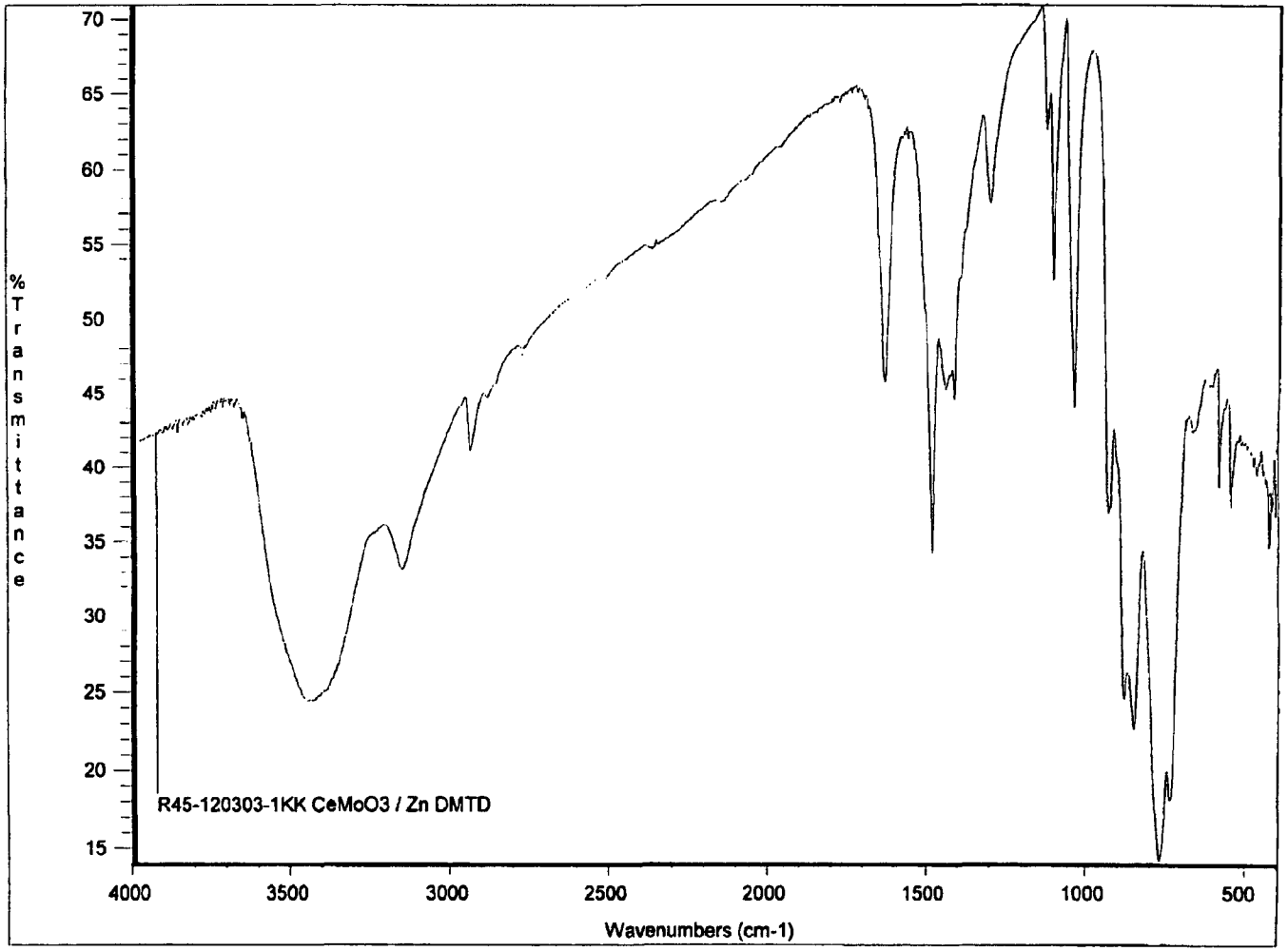
Fig. 13 IR-Spectrum of CeMolybdate/CeCarbonate/Zn(DMTD)2 according to Example 22

CORROSION INHIBITOR COMPOSITION APPLICABLE FOR ALUMINUM AND STEEL PROTECTION AND PROCEDURE

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

RELATED APPLICATION

This application is a continuation-in-part application of application Ser. No. 10/138,794, filed 3 May 2002 now abandoned, which claims the benefit of provisional application Ser. No. 60/288,895, filed 4 May 2001.

BACKGROUND OF THE INVENTION

Protection of aluminum against atmospheric corrosion constitutes a challenge of significant economic importance. Several distinct aluminum alloys are known, characterized by different susceptibility to atmospheric corrosion. Among others, aluminum alloys containing a small percentage of Cu are well known and valued for their excellent mechanical properties, as, for example, Al 2024 T-3, widely applied in aircraft manufacturing industry.

It is well known, however, that due to copper rich intermetallic species randomly distributed in the aluminum matrix, which are spontaneously polarized as cathodic sites and catalyze the $O_2$ reduction, the cathodic reaction of atmospheric corrosion, Al 2024 T-3 is also more susceptible to atmospheric corrosion.

There are two distinct corrosion control technologies commonly applied to protect aluminum alloys (such as Al 2024 T-3) against atmospheric corrosion: conversion coatings and organic coatings.

As for conversion coatings, Alodine 1200 is one of the well-known corrosion inhibitor technology widely applied for Al 2024 T-3 protection. It is based on soluble chromates containing $CrO_4^{--}$ as an inhibitor species and yields a robust conversion coating on aluminum substrates. A measure of its robustness, Alodine 1200 conversion coating on Al 2024 T-3 aluminum panels is known to resist salt spray exposure in excess of 300 hours, without pitting. In addition, conversion coatings are designed to enhance the adhesion of organic primers subsequently applied on aluminum substrates, a requirement also satisfied by Alodine 1200. Such procedures using chromates are thus considered to be the standard of the industry with respect to obtainable protection performance.

Aircraft primers and coil primers are the typical high performance organic coatings that are applied for protection of aluminum, such as especially in the aircraft manufacturing industry. A thickness of less than 20 micron is characteristic of these primers, which thus provide a negligible barrier function and, consequently, mandate the use of effective corrosion inhibitor pigments.

As is well known, pigment grade corrosion inhibitors used in organic primers must contain anionic species with inhibitor activity and must be characterized by limited, but effective, solubility in water. For these reasons, it will be apparent that $CrO_4^{--}$ is the corrosion inhibitor species preferred in both corrosion control technologies applied on aluminum for protection against atmospheric corrosion that is in conversion coatings and high performance organic primers.

$SrCrO_4$ is the corrosion inhibitor pigment of choice for aircraft and coil primers, and is the standard in the industry. Due to environmental concerns, finding a replacement for chromates in conversion coatings and organic coatings constitutes the objective of contemporary research in this field.

It is generally known that if toxicity, efficiency, and price are considered, the number of inorganic corrosion inhibitor species available for chromate replacement is limited essentially to a few anionic species, and specifically to $MoO_4^{--}$, $PO_4^{--}$, $BO_2^{--}$, $SiO_4^{--}$ and $NCN^-$. As a consequence, all commercial non-chromate corrosion inhibitor pigments are molybdates, phosphates, borates, silicates or cyanamides, or combinations of these compounds. Except for Zn-(II) and Ce, which are credited with some degree of efficiency, the direct contribution of cationic species to the corrosion inhibitor performance of pigments is marginal. However, cations do determine the solubility and hydrolysis pH of pigments.

In comparison to $CrO_4^{--}$, inherent limitations of their corrosion preventing mechanism render these above-specified anionic species less effective inhibitors of corrosion, in general, and specifically of atmospheric corrosion of aluminum. Consequently, it appears that inorganic chemistry is unable to produce inhibitors of atmospheric corrosion, which could be comparably effective, non-toxic alternative of $CrO_4^{--}$. In contrast, a large arsenal of organic corrosion inhibitor is known and applied in various corrosion control technologies. Excessive solubility in water and/or volatility of most of the known organic inhibitors appear to be the physical properties that are inconsistent with applications in conversion coating technologies and in organic coatings. To date, no organic corrosion inhibitor is known to be an effective replacement of chromates in conversion coatings or organic coatings intended for metal protection.

SUMMARY OF THE INVENTION

It has been discovered pursuant to the present invention that organic compounds possessing cyclic structural features of aromatic character, carbocyclic and, specifically, heterocyclic aromatic structures containing one or multiple hetero species, such as, specifically, N, S, O atoms or combinations of the same, and preferably multiple —SH (mercapto) and =S, or thiol-thion functionalities attached, are effective inhibitors of corrosion of aluminum and its alloys. This discovery was not anticipated, considering that thiol-organic compounds (or/and $H_2S$) do not form essentially insoluble compounds (salts) with Al (III). As known, forming essentially insoluble (in water) compounds with ionic species of a specific metal is a general prerequisite for corrosion inhibitor activity of organic compounds on the respective metal substrate.

Specifically, the family of thio-organic compounds that includes di-mercapto and poly-mercapto compounds and their derivatives has been established as effective corrosion inhibiting products.

The following di- or poly-mercapto organic compounds are applicable:

di-mercapto derivatives of thiophene, pyrrole, furane, and of diazoles and thiadiazoles;

di- and tri-mercapto derivatives of pyridine, diazines, triazines and of benzimidazole and benzthiazole;

The following compounds and related derivatives are specifically identified:

2,5-dimercapto-1,3,4-thiadiazole or Bismuthiol 1 and 2,4-dimercapto-s-triazolo-[4,3-b]-1,3-4-thiadiazole or $C_3H_2N_4S_3$, and 5,5'-dithiobis(1,3,4-thiadiazole-2(3H)-thione and 5,5'-thiobis(1,3,4-thiadiazole-2(3H)-thione; and 1,3,5-triazine-2,4,6(1H,3H,5H)-trithione, or trithiocyanuric acid (TMT), and dithiocyanuric acid, dimercaptopyridine, 2,4-dithiohydantoine, and 2,4-dimercapto-6-amino-5-triazine.

Applicable derivatives of the above-specified di- and poly-mercapto organic compounds include:

salts formed with metal cationic species, alkyl-, aryl- and quaternary-ammonium salts, various N- and S-substituted derivatives, such as 5-mercapto-3-phenyl-1,3,4-thiadiazoline-2-thione or Bismuthiol II;

various N,N-, S,S- and N,S-substituted derivatives of the above compounds; and dimer and polymer derivatives of the above, resulted form oxidative dimerization or polymerization of di- and poly-mercapto compounds.

More specifically, it has been discovered that 2,5-dimercapto-1,3,4 thiadiazole symbolized by HS—$CN_2$SC—SH or "DMTD" and its derivatives inhibit atmospheric corrosion of aluminum, including Al 2024 T-3. It has been also proven that DMTD and various DMTD derivatives in pigment grade form are applicable as components of organic primers or in soluble or partially soluble form as an inhibitor constituent of conversion coating compositions intended for aluminum protection.

This discovery was unexpected, considering that DMTD does not form essentially insoluble compounds with Al(III), of which this characteristic is generally a prerequisite for corrosion inhibition activity of organic compounds on metal substrates.

Although unexpected, this effect is explicable in light of the present research, however, considering the high chemical affinity displayed by organic thiol derivatives, in general, and specifically by DMTD and TMT, toward Cu(II) and Cu-rich surfaces. In the specific case of DMTD, it has been shown that DMTD spontaneously forms stable chemisorbtion layers on cathodically polarized Cu surface and, consequently, inhibits cathodic $O_2$ reduction in aqueous conditions. Based on this, it can be reasonable assumed that DMTD operates by similar mechanism on (cathodic) Cu-rich intermetallics of Al-2024 in atmospheric conditions.

Along with DMTD, it has also been discovered pursuant to the present invention, that trithiocyanuric acid, or TMT, which can be classified as a tri-mercapto derivative, and its derivatives are also effective corrosion inhibitors of aluminum in a similar fashion as DMTD. It has also been discovered that DMTD and TMT and their derivatives are effective corrosion inhibitors of galvanized steel and similar metal substrates, where these compounds interact with and protect the sacrificial zinc layer and, thus, indirectly protect the steel substrate.

More specifically, while Zn(II)-DMTD salts have been previously mentioned in Sinko's U.S. Pat. No. 6,139,610, assigned to the same assignee as the present invention, other metal DMTD and TMT salts have been synthesized pursuant to the present invention and determined to be effective corrosion inhibitors, such as: Bi(III), Co(II), Cd(II), Pb(II), Ag(I), Sb(III), Sn(II), Cu(II), Fe(II), Ni(II) and also the comparable soluble Li(I), Ca(II), Sr(II), Mg(II), La(III), Ce(III), Pr(III), Zr(IV) salts.

Furthermore, it has been determined pursuant to the present invention that inherently conductive polymers, such as polyaniline, polythiophene, polypyrrole, if protonated (i.e. doped) with mercapto-derivatives of acidic character and specifically with DMTD, TMT and related derivatives, are useful as corrosion inhibitors. It will be apparent that these resultant compounds formally are regarded as salts of DMTD and TMT formed with conductive polymers.

BRIEF DESCRIPTION OF THE DRAWING

FIGS. 1-13 are graphical prints representing IR spectra of products produced pursuant to the invention.

DETAILED DESCRIPTION OF THE INVENTION

The following description will describe in detail the synthesis of selected derivatives of 2,5-dimercapto-1,3,4 thiadiazole symbolized by HS—$CN_2$SC—SH or "DMTD", and of selected derivatives of trythiocyanuric acid, or "TMT", preferably used for application as a corrosion inhibitor in connection with a paint. DMTD, which is a di-mercapto derivative, and TMT, which is a tri-mercapto derivative, generally may be classified together. While it is believed that these corrosion inhibitors are applicable to a wide range of substrates, the following description reveals examples of applications to aluminum, galvanized steel, and similar metal substrates.

The following are examples of DMTD, TMT, and derivatives of DMTD and TMT applicable to the practice of the invention:

1. 2,5-dimercapto-1,3,4 thiadiazole (DMTD), and 2,4-dimercapto-s-triazolo-[4,3-b]-1,3-4-thiadiazole, and trithiocyanuric acid (TMT);

2. Various N-,S- and N,N-, S,S- and N,S-substituted derivatives of DMTD such as 5-mercapto-3-phenil-1,3,4-thiadiazoline-2-thione or bismuthiol II; various S-substituted derivatives of trithiocyanuric acid;

3. 5,5' dithio-bis (1,3,4 thiadiazole-2(3H)-thione or $(DMTD)_2$, or (DMTD), the polymer of DMTD; 5,5' thio-bis (1,3,4 thiadiazole-2(3H)-thione; $(TMT)_2$, the dimer and polymers of TMT;

4. Salts of DMTD of the general formula: $M(DMTD)_n$, where n=1, 2 or 3, and M is a metal cation and preferable M=Zn(II), Bi(III), Co(II), Ni(II), Cd(II), Pb(II), Ag(I), Sb(III), Sn(II), Fe(II), or Cu(II) (examples: ZnDMTD, $Zn(DMTD)_2$, $Bi(DMTD)_3$); similar salts of TMT, as for example, ZnTMT, in a ratio of 1:1; and, also, the comparable soluble Li(I), Ca(II), Sr(II), Mg(II), La(III), Ce(III), Pr(III), Zr(IV) salts 5. Salts of $(DMTD)_n$ of general formula $M[(DMTD)_n]_m$, where n=2 or n>2, m=1, 2, or 3 and M is as above specified in 4. Typical examples are: $Zn[(DMTD)_2]$, $Zn[(DMTD)_2]_2$;

6. Ammonium-, aryl-, or alkyl-ammonium salts of DMTD, $(DMTD)_n$, or 5,5' thio-bis (1,3,4 thiadiazole-2(3H)-thione or 2,4-dimercapto-s-triazolo-[4,3-b]-1,3-4-thiadiazole. Typical examples include: Cyclohexyl amine: DMTD, in ratios of 1:1 and 2:1; Di-cyclohexyl amine: DMTD, in ratios of 1:1 and 2:1; Aniline: DMTD, in ratios of 1:1 and 2:1; similar salts of TMT, as for example Di-cyclohexyl amine: TMT, in a ratio of 1:1;

7. Quaternary ammonium salts of DMTD or $(DMTD)_n$, and TMT

8. Poly-ammonium salt of DMTD or $(DMTD)_n$ and TMT formed with polyamines;

9. Inherently conductive polyaniline doped with DMTD or $(DMTD)_2$ or 5,5'thio-bis (1,3,4 thiadiazole-2(3H)-thione and TMT 10. Inherently conductive polypyrrol and/or polythiophen doped with DMTD, $(DMTD)_2$ and 5,5' thio-bis (1,3,4 thiadiazole-2(3H)-thione and/or TMT;

11. Micro or nano composites of poly DMTD/polyaniline, poly DMTD/polypyrrol, and poly DMTD/polythiophen; similar micro or nano composites with TMT; and with 5,5' thio-bis (1,3,4 thiadiazole-2(3H)-thione; DMTD or salts of DMTD or derivatives of DMTD and of TMT, as organic constituents of various pigment grade inorganic matrixes or physical mixtures; it will be apparent that, with no intent to limit the concept of the present invention, such inorganic matrixes are preferable constituted of non-toxic anionic and cationic species with corrosion inhibitor properties, such as: $MoO_4^{--}$, $PO_4^{--}$, $HPO_3^{--}$, poly-phosphates, $BO_2^{--}$, $SiO_4^{--}$, $NCN^-$, $WO_4^{--}$, phosphomolybdate, phosphotungstate and respectively, Mg, Ca, Sr, La, Ce, Zn, Fe, Al, Bi.

12. DMTD or salts of DMTD or derivatives of DMTD and TMT in encapsulated forms, such as: inclusions in various polymer matrices, or as cyclodextrin-inclusion compounds or in microencapsulated form; and 13. various combinations of all of the above. Likewise, it is understood that the above list is not conclusive, and similar compounds and derivatives will yield similar results.

Pigment grade forms of DMTD include $Zn(DMTD)_2$ and Zn-DMTD (among other organic and inorganic salts of the former) and combinations of the latter with inorganic products or corrosion inhibitor pigments, such as: phosphates, molybdates, borates, silicates, tungstates, phosphotungstates, phosphomolybdates, cyanamides or carbonates of the previously specified cationic species, as well as selected oxides. Examples include: zinc phosphate, cerium molybdate, calcium silicate, strontium borate, zinc cyanamide, cerium phosphotungstate and respectively, ZnO, $CeO_2$, $ZrO_2$ amorphous $SiO_2$ or combinations of these compounds;

Regarding the synthesis of the Zn salts of DMTD, it has been discovered pursuant to the present invention, that the spontaneous reaction of ZnO and DMTD yields exclusively $Zn(DMTD)_2$, as follows:

$$ZnO+2HS—CN_2SC—SH=Zn(—S—CN_2SC—SH)_2+H_2O \quad (1)$$

Reaction 1 implies that, apparently, Zn-DMTD cannot be produced by simply adjusting the DMTD/ZnO stoichiometric ratio to 1:1.

Di-mercapto derivatives useful in the practice of the invention are those having a limited solubility in water, from about 0.01 and 1000 millimoles (mmole) per liter. The greatly preferred range of solubilities is 0.1 to 10 mmole/l.

EXAMPLES

Example 1

This example is intended to disclose the synthesis of $Zn(DMTD)_2$ according to the above-presented Reaction 1.

As known, DMTD forms two distinct Zn(II) salts; that is, Zn-DMTD or the 1:1 salts, and $Zn(DMTD)_2$ or the 1:2 salts. Each compound can be conveniently prepared by double decomposition in an aqueous medium, using, in corresponding stoichiometrical ratio, soluble Zn(II) salts and soluble salts of DMTD, such as $Na_2$-DMTD and Na-DMTD, respectively. Intuitively, both salts are also expected to form by reacting ZnO and DMTD, in a 1:1 or 1:2 stoichiometrical ratio, respectively.

It has been discovered pursuant to the present invention, however, that by reacting ZnO and DMTD, only $Zn(DMTD)_2$ forms. It will be apparent, that Reaction 1 is convenient in that it does not yield by-products. In practice, the synthesis according to reaction 1 was carried out as follows:

1 mol (81.4 g) of high grade ZnO, of 0.25 micron average particle size, was re-slurried in 300 ml water by intense agitation and by heating to 50-60° C., after which the same conditions were maintained for 1 (one) hour. Concurrently, an aqueous suspension was prepared by stirring, at ambient temperature, 2 moles of DMTD (from R.T. Vanderbilt Company, Inc.) in 2000 ml water.

Reaction 1 was realized by gradually transferring, in about 30 min., the aqueous suspension of DMTD into the intensively stirred suspension of ZnO and by maintaining the same conditions, at 50-60° C., for 2 (two) hours. Subsequently, the solid phase was isolated by filtration, dried at 100-105° C. to 0.5-2% moisture content and pulverized. Notably, the process water was integrally recyclable.

Relevant analytical data and IR spectrum are presented below, in Table 1 and FIG. 1, respectively.

TABLE 1

| Measured quality parameters | Determined values |
|---|---|
| appearance | Yellow powder |
| specific gravity | 2.2 |
| solubility in water, at 24° C. | 0.4 g/l |
| pH (saturated extract) | 4.5-5.0 |
| yield, g | 355.0 |

Example 2

This example is intended to disclose one synthesis procedure applicable for incorporating DMTD into a complex solid matrix corresponding to the general composition of 45% $Zn(DMTD)_2$/32% $Zn_3(PO_4)22H_2O$/23% ZnO.

In practice, the synthesis was carried out as follows:

6.33 moles (515.0 g) of high grade ZnO (0.25 micron average particle size), was re-slurried in 2000 ml water at 50-60° C. and intense agitation for 1 (one) hour. After that, 1.5 moles of $H_3PO_4$, as 50% solution, were introduced gradually into the ZnO slurry and the same conditions were continued for 30 minutes. Subsequently, an aqueous suspension of 2.5 moles of DMTD in 1500 ml water was introduced in about 30 minutes. The intensively stirred slurry was heated to 75-80° C. and the same conditions were maintained for 2 (two) hours. The solid phase was isolated by filtration, dried at 100-105° C. to 0.5-2% moisture content and pulverized.

Relevant analytical data are presented below, in Table 2.

TABLE 2

| Measured quality parameters | Determined values |
|---|---|
| appearance | Light yellow powder |
| specific gravity | 2.7 |
| solubility, at 24° C. | 0.3 g/l |
| pH (saturated extract) | 5-6 |
| oil absorption, lbs/100 lbs | 33 |
| yield, g | 992 |

Example 3

Application of a DMTD derivative as a corrosion inhibitor pigment:

A pigment grade composite of 45% $Zn(DMTD)_2$/32% $Zn_3(PO_4)_2.2H_2O$/23% ZnO, synthesized according to Example 2, was tested on aluminum, comparatively to a double control: commercial strontium chromate (Control A), which is the "gold" standard of the industry for corrosion inhibitor pigments and a molybdate-based product (Control B) considered representative of commercially available non-chromate corrosion inhibitor pigments. The test was performed in a typical two component aircraft primer formulation, specifically recommended for aluminum protection.

The description of the different versions of this formulation, the Test primer and of the Control A and Control B primers, are presented below.

TABLE 3

| Components of Formulations | Trade Names & Suppliers of Components | Parts by Weight Test | Control A | Control B |
|---|---|---|---|---|
| | EPOXY BASE/PARTA | | | |
| Epoxy Resin | Shell Epon 1001 CX75 (1) | 163.0 | 163.0 | 163.0 |
| Solvents | Glycol ether PM | 148.0 | 148.0 | 148.0 |
| | MIBK | 36.7 | 36.7 | 36.7 |
| Fillers | RCL-535 TiO2 (2) | 20.6 | 20.6 | 20.6 |
| | Min-U-Sil 15 (3) | 26.0 | 26.0 | 26.0 |
| | 12-50 Talc (4) | 49.3 | 49.3 | 49.0 |
| | Corrosion Inhibitor Pigments | | | |
| $Zn(DMTD)_2$ in solid matrix composite (See Example 2) | See Example 2. | 78.0 | — | — |
| Strontium Chromate | SrCrO4-176 (5) | — | 107.5 | — |
| $MoO_4^{(2-)}$ based pigment. | Commercial (6) | — | — | 86.0 |
| | Total part A - weight | 551.0 | 551.0 | 551.0 |
| | Volume, gallons | 50.0 | 50.0 | 50.0 |
| | CATALYST/PART B | | | |
| Hardener | HY-815 Polyamide (7) | 67.1 | 67.1 | 67.1 |
| Solvents | Toluene | 59.1 | 59.1 | 59.1 |
| | Isopropanol | 218.5 | 218.5 | 21.5 |
| | Total Part B - weight | 344.7 | 344.7 | 344.7 |
| | Volume, Gallon | 50.0 | 50.0 | 50.0 |

Raw material suppliers:
(1) Shell Chemical
(2) S.C.M. Chemicals.
(3) Unimin Corporation
(4) Pfizer.
(5) Wayne Pigment Corp.
(6) The Sherwin-Williams Co.
(7) Ciba-Geigy Part A (epoxy base) and Part B (catalyst) were mixed in 1:1 ratio by volume, and inducted for 30 min. before application.

Example 4

This example demonstrates the efficiency of DMTD derivatives in organic coatings in a corrosion inhibitor pigment.

In order to comparatively assess the corrosion inhibitor activity of DMTD derivatives, the Test primer of Example 3 as well as Control A and Control B primer formulations were applied by wire-wound rod, on several, Alodine 1200 (MIL-C-5541) treated bare 2024 T-3 aluminum panels (from The Q-Panel Co.), at 0.6-0.8 mils dry film thickness, aged for 7 days at room temperature, scribed and subsequently subjected to salt spray exposure (according to ASTM B-117) for 2000 hours. Notably, the scribes were applied in the typical cross form, at an approximate width of 2 mm, and, in order to penetrate through the Alodine 1200 conversion coating, at an appropriate depth.

By visual examination of their physical state at the end of the test period, the coatings' corrosion inhibitor performance, considered directly proportional to the tested pigment components' corrosion inhibitive activity, was qualified. The scribed area was especially examined and the absence or presence of corrosion products, respectively, was interpreted as display of, or absence of, the respective corrosion inhibitor pigment's "throw power". It will be apparent that the "throw power" is the discriminative characteristic of effective corrosion inhibitor pigments. Test results are summarized in Table 4.

TABLE 4

| Coating/inhibitor Pigment Tested | Qualification of Performance: Field | Scribe Area | "Throw Power" Observed |
|---|---|---|---|
| Test primer/Zn $(DMTD)_2$ in a solid matrix (See Example 2) | Intact | Void of corrosion products | yes |
| Control A/$SrCrO_4$ | Intact | Void of corrosion products | yes |
| Control B/$MoO_4^{(2-)}$ based pigment | Intact | Filled with corrosion products | no |

Both Control coatings and the Test coating were found intact in the field at the end of the test period and it was concluded that 2000 hours of salt spray exposure was not sufficiently discriminant. Similarly to $CrO_4^{--}$, DMTD displayed throw power, however, by maintaining the scribe area void of corrosion products, in a passive state for the duration of the salt spray exposure test. In the same conditions, $MoO_4^{--}$ did not show throw power. It was concluded that DMTD derivatives possess effective corrosion inhibitor activity on aluminum and are applicable in pigment grades in organic primers intended for such.

Example 5

Applicability of DMTD in soluble forms in conversion coatings for aluminum protection.

DMTD based conversion coating was applied on several 2024 T-3 aluminum (the Test and Control) panels according to the following protocol: de-greasing, rinsing, deoxidizing (I), rinsing, deoxidizing (II), rinsing, treatment with DMTD (only of the Test panels), drying, post treatment with Zr(IV)/$K_2ZrF_6$ solution, rinsing and drying. In practice, rinsing (performed in stirred water at ambient temperature for 1 minute) and all operations were carried out by immersion as follows:

The Test and Control panels were de-greased in an alkaline cleaner solution (containing 2% of each: $Na_2CO_3$ and $Na_3PO_4$) at 50° C. for 1 minute, followed by rinsing at normal temperature for 1 minute. Deoxidizing was performed in two phases. Phase (I) was carried out in 25% $H_2SO_4$ solution at 60° C. for 1 minute, followed by rinsing, and phase (II) was performed in 50% $HNO_3$ solution at normal temperature for 30 seconds, followed by subsequent rinsing. DMTD based conversion coating was applied (only on the Test panels) by immersion for 10 minutes in saturated DMTD solution at 60° C., under agitation and, without rinsing, by subsequent drying at about 100-110° C. for approximately 10 minutes. Both the Test and the Control panels (the latter without DMTD coating) were post-treated by immersion, for 10 minutes, in a solution containing 0.5% $ZrNO_3$+0.5% $K_2ZrF_6$, at 60° C. under agitation. The treatment was finalized by rinsing and drying the Test and Control panels at 110° C. for 10 minutes.

Example 6

In order to assess the quality of DMTD-based conversion coating on 2024 T-3 aluminum, the Test panels were tested for corrosion resistance (according to ASTM B-117) and paint adhesion (tape test), in comparison with the Control panels, as well as with Alodine 1200 treated 2024 T-3 aluminum panels, the latter being the standard of the industry. The test results are presented below.

TABLE 6

| Tested panels | Corrosion resistance Rating* after 336 hours salt spray: | Paint adhesion by tape test: |
|---|---|---|
| Test | 8, some pitting | Pass |
| Control | 0 | Fail |
| Standard | 8, some pitting | Pass |

*rating is considered on the 0 (extensive corrosion) to 10 (no corrosion) numeric scale.

As the presented data indicates, the DMTD-based conversion coating on 2024 T-3 Aluminum, applied according to the present invention, possesses robust resistance to corrosion and good paint adhesion, similar to chromate-based Alodine 1200 conversion coatings.

It was concluded that the DMTD derivatives are applicable as corrosion inhibitors in conversion coating technologies intended for aluminum protection.

Example 7

Di-cyclohexyl mono-ammonium salt of trithiocyanuric acid was synthesized according to the following procedure:

0.1 moles of di-cyclohexylamine (from Aldrich Chemical), dissolved in 0.15 moles of $H_2SO_4$ solution of approximately 20%, was subsequently reacted by agitation with 0.1 mole of Na-trithiocyanurate (from Aldrich Chemical) dissolved in 100 ml water. After the pH was adjusted to 6.5-7.0, the resultant slurry was filtered, washed to a soluble, salt-free condition, dried at approximately 100° C. and the solid product was subsequently pulverized.

Yield: 34 g, 95% of theoretical.

The relevant IR spectrum is presented in FIG. 2.

Example 8

Di-cyclohexyl mono-ammonium salt of DMTD was synthesized as follows:

0.2 moles of DMTD (from R.T. Vanderbilt Company, Inc.), previously dissolved in 150 ml aqueous solution containing 0.28 moles of NaOH, was reacted with 0.2 moles of dicyclohexylamine dissolved in 100 ml solution containing 0.14 moles of $H_2SO_4$.

After the pH was adjusted to 6.5-7.0, the resultant slurry was filtered, washed to a soluble, salt-free condition, dried and subsequently pulverized.

Yield: 66 g, approximately 90% of theoretical.

Relevant IR spectrum is presented in FIG. 3.

Example 9

Bi-DMTD (1:3) salt, or $Bi(DMTD)_3$, was synthesized as follows:

Initially, (A) was prepared by dissolving 0.15 moles of $Bi(NO_3).5H_2O$ in 1000 ml aqueous solution containing 0.5 moles of $HNO_3$, and (B) was prepared by dissolving 0.46 moles of DMTD in 1000 ml solution containing 0.92 moles of NaOH.

$Bi(DMTD)_3$ was subsequently obtained by introducing (A) and (B), at identical delivery rates and simultaneously, into 200 ml water under intense agitation. After the pH was adjusted to 3.0, the obtained slurry was stirred for 1 hour, filtered, washed to soluble salt free condition, dried at 110° C. overnight and pulverized.

Yield: 98 g, approx. 99% of theoretical.

Relevant IR spectrum is presented in FIG. 4.

Example 10

Poly-aniline/Trithiocyanuric acid (2:1) microcomposite was prepared according to the following procedure:

Initially, an aqueous suspension of Trithiocyanuric acid was prepared by reacting 0.05 moles of trisodium salt of trithiocyanuric acid (or 2,4,6-Trimercapto-s-triazine trisodium salt) dissolved in 200 ml water, with 0.16 moles of $H_2SO_4$ under intense agitation. Subsequently, a previously prepared aqueous solution, containing 0.1 mole aniline and 0.22 moles of HCl in 200 ml water, was added to the above-described suspension. Finally, 23 g ammonium persulfate (as an aqueous solution) and 0.5 g of $FeCl_3$ was introduced into the reaction system, which was stirred overnight at room temperature. The resultant dark green slurry was filtered, washed to soluble, salt-free conditions, dried at 70-100° C. and pulverized.

Yield: 17 g

Relevant IR spectrum is presented in FIG. 5.

Example 11

Zn(II) salt of trithiocyanuric acid, ZnTMT 1:1, was produced according to the following procedure:

Solution (A), containing 0.1 mole of trisodium salt of trithyocyanuric acid in 500 ml water, and solution (B), containing 0.1 mole of $Zn(NO_3)_2$ and 0.1 mole of $HNO_3$ in 500 ml water, were introduced simultaneously and at identical delivery rates, into 200 ml of intensively stirred water at about 50° C. The pH of the obtained slurry was adjusted to about 5 and after 1 (one) hour, during which the reaction conditions were maintained the same, the solid phase was separated by filtration, washed to soluble salt-free conditions, dried at 110° C. overnight and subsequently pulverized.

Yield: 22 g, 89% of theoretical.

Pertinent IR spectrum is presented in FIG. 6.

While the invention may be used in connection with a paint, it may also be used in connection with other protective coatings. For example, sol-gel protective coatings, which are generally known in the art, are silane-based, applicable for aluminum protection, and are considered as replacement of chromate-based conversion coatings such as Alodine 1200. The following example shows a practical procedure for applying the current invention in connection with a typical sol-gel process.

Example 12

Several Al 2024 T-3 Aluminum panels were degreased, and also de-oxidized in identical fashion as described in Example 5, and subsequently air-dried.

Solution (A) was prepared by dissolving 0.02 moles of diethylenetriamine and 0.01 moles of DMTD, in 100 ml water.

Solution (B) was prepared by the addition of 0.02 moles of tetramethoxysilane and 0.06 moles of glycidoxypropyltrimethoxysilane into 200 ml water and by adjusting the pH of the solution to about 4-4.5 with acetic acid, under continuous stirring at normal temperature.

After approximately 1 (one) hour, during which the hydrolysis process of the silane precursors proceeded in Solution (B), solution (A) was introduced into it under continuous agitation.

Test panels were prepared by the application, after about 10 minutes of stirring, of the resulted emulsion of silane condensate onto above specified aluminum panels at a spread rate of approximately 0.2-0.3 ml per 100 $cm^2$ and air-dried.

Control panels were prepared in similar fashion, except that Solution (A) was void of DMTD.

Example 13

Pigment grade Sr-doped amorphous silica of $SrSiO_3.11SiO_2.5.7H_2O$ composition, containing approximately 9.5% Sr species, was synthesized according to the following procedure:

Initially, solution A was prepared by reacting 0.51 mole of $SrCO_3$ and 3.5 moles of $HNO_3$ and adjusting the volume of the resulted solution to 1300 ml with water. Solution B was prepared by dissolving 1.9 moles of sodium silicate of $Na_2O(SiO_2)_{3.22}$ composition (from Hydrite Chemical Co., WI), in 900 ml of water.

Solutions A and B were delivered simultaneously and with identical rates for approximately 1 (one) hour into 500 ml of intensively stirred water at 70-85° C. At the end, the pH was adjusted to 8-8.5 and the same conditions were maintained for an additional 2 (two) hours, after which the resultant solid phase was separated by filtration, washed to soluble, salt-free conditions, dried at approximately 105° C. overnight, and pulverized.

Relevant analytical data and IR spectrum results are presented below in Table 13 and FIG. 7, respectively.

TABLE 13

| Measured Parameters | Determined Values |
|---|---|
| appearance | White powder |
| specific gravity | 1.8-1.9 |
| pH(saturated extract) | 9.0-9.3 |
| oil absorption, lbs/100 lbs | 52-60 |
| Sr, % (calculated) | 9.5 |
| $H_2O$, % (by ignition at 600° C.) | 16.5 |
| yield, g | 471 |

Example 14

A pigment grade mixture of trithiocyanuric acid and Sr-doped Amorphous Silica of $SrSiO_3.11SiO_2.5H_2O$+1TMT (approximate composition), containing about 8% Sr (calculated) and 17% TMT (calculated), was produced as follows:

100 g of trithiocyanuric acid, in powder form, was blended into 460 g of Sr-doped amorphous silica in dry granular form. The Sr-doped amorphous silica was synthesized and processed as shown in Example 13. The obtained mixture was subsequently pulverized to a fineness of about 6 on the Hegman scale.

Trithiocyanuric acid was obtained from an aqueous solution of tri-sodium-trithiocyanurate, by adjusting the solutions pH to about 3, filtering, washing, and drying the resultant solid phase.

Relevant analytical data and IR spectrum results are presented below in Table 14 and in FIG. 8, respectively.

TABLE 14

| Measured Parameters | Determined Values |
|---|---|
| appearance | Light yellow powder |
| specific gravity | 1.7 |
| pH(saturated extract) | 6.9 |
| oil absorption, lbs/100 lbs | 75-85 |
| Sr, % (calculated) | 7.9 |
| TMT % (calculated) | 17 |
| Yield, g | 560 |

Example 15

This example is intended to demonstrate the application of trithiocyanuric acid ("TMT") as a corrosion inhibitor constituent of an amorphous silica+TMT pigment grade mixture in a typical coil coating formulation.

The pigment grade mixture of $SrSiO_3.11SiO_2.5H_2O$+1TMT composition was synthesized according to the process in Example 14, and was tested (See Test formulation, Table 15) on galvanized steel (from L.T.V. Steel Co.), in comparison with commercial Strontium chromate (Control A formulation, Table 15), the "gold" standard of the industry for corrosion inhibitor pigments, and respectively, Sr-doped amorphous silica synthesized according to Example 13 (Control B formulation, Table 15).

The typical solvent-borne polyester coil primer formulation is specifically recommended for galvanized steel protection. Description of the test formulation, and control formulations A and B are presented below in Table 15.

TABLE 15

| Components of Formulations | Trade Names & Suppliers of Components | Parts by Weight: Test Formulation | Control Formulation A | Control Formulation B |
|---|---|---|---|---|
| Polyester Resin | EPS 3302 (1) | 536.0 | 536.0 | 536.0 |
| Solvents | Aromatic 150 | 118.0 | 118.0 | 118.0 |
| | Diacetone Alcohol | 73.5 | 73.5 | 73.5 |
| Fillers | RCL-535 $TiO_2$ (2) | 46.0 | 46.0 | 46.0 |
| | Aerosil R.972 (3) | 2.1 | 2.1 | 2.1 |
| Catalyst | Cycat 4040 (4) | 7.6 | 7.6 | 7.6 |
| Hardener | Cymel 303 (4) | 73.6 | 73.6 | 73.6 |
| | Corrosion Inhibitor Pigments | | | |
| Strontium Chromate | $SrCrO_4$-176 (5) | — | 143.5 | — |
| Sr-doped amorphous silica | As shown in Example 13 | — | — | 120.0 |
| Sr-doped silica + TMT pigment grade mixture | As shown in Example 14 | 150.0 | — | — |
| Total Weight | | 1006.8 | 1000.3 | 976.8 |

Raw Material Suppliers:
(1) Engineering Polymer Solutions
(2) Millennium Inorganic Materials
(3) DeGussa Corporation
(4) Cytec.
(5) Wayne Pigment Corporation The formulation was ground to a fineness of 6.5-7.0 Hegman before application.

Example 16

This example demonstrates the applicability of di-mercapto and tri-thio derivatives according to the present invention, as corrosion inhibitor additives in paint formulations. Specifically, the application of trithiocyanuric acid—di-cyclohexylamine salt of a 1:1 ratio, as an additive in a typical coil primer formulation, is disclosed.

The coil primer formulation prepared was identical to the test formulation described in Example 15 (See Table 15), except that the corrosion inhibitor constituent consisted of 120 parts by weight Sr-doped Amorphous Silica, prepared according to example 13, and 30 parts by weight of trithiocyanuric acid-di-cyclohexylamine salt of a 1:1 ratio. This was introduced into the formulation to end up with 1006.8 parts by weight of paint and ground to 6.5-7.0 fineness on the Hegman scale. The trithiocyanuric acid-di-cyclohexylamine 1:1 salt was synthesized according to Example 7 of the present invention.

Consequently, the corrosion inhibitor constituent of the test formulation according to Example 16 consists of an ordinary physical mixture of the above two components. The results are shown in Table 17 (See Example 17).

Example 17

This Example demonstrates the efficiency of di-mercapto derivatives, in general, and of trithiocyanuric acid and its derivatives, in particular, as corrosion inhibitor pigments or additives in coil primer formulations and on typical coil substrates, such as galvanized steel. It will be, however, apparent to one skilled in the art that the concept of the present invention applies for primers intended for steel protection in general.

In order to comparatively assess the corrosion inhibitor activity of trithiocyanuric acid and its derivatives, the test primers of Examples 15 & 16, along with control formulations A & B from Example 15, were applied by wire-wound rod, on several galvanized steel panels (from L.T.V. Steel Co.), at 0.6-0.7 mil dry film thickness, aged for at least 2 (two) days at room temperature, scribed and subsequently subjected to salt spray exposure (according to ASTM B-117).

The scribes were applied in the typical cross form, and, in order to cut through the protective galvanic zinc coating from the area of the scribes, at appropriate depth. During salt spray exposure, the coatings' physical state was assessed periodically by visual examination. Scribe areas were observed for the absence or presence of corrosion products (white rust), and "field" areas were observed for the physical integrity of coatings and the presence of white rust.

Notably, the protective performance of the tested coatings was qualified by the service life of coatings, defined as the total hours of salt spray exposure that result in extensive corrosion along the scribes and considerable corrosion in the "field" areas. Service life of a coating is considered directly proportional to the related pigments' or additives' corrosion inhibitor performance, which is conveniently qualified by $E_i$, the Inhibitor Efficiency Index, defined as:

$$E_i=100[(\text{service life})_{TEST}-(\text{service life})_{CONTROL}]/(\text{service life})_{CONTROL}.$$

It is important to note that the service life of control formulation A from Example 15, containing $SrCrO_4$ as a corrosion inhibitor pigment, was considered as the test control, or $(\text{service life})_{CONTROL}$.

It will be apparent, that values of $E_i>0$ indicate comparatively better corrosion inhibitor performance than the control's ($SrCrO_4$'s) performance, whereas values of $E_i<0$ indicate a poorer corrosion inhibitor performance than that of the control. The test results are summarized below in table 17.

TABLE 17

| Test | Inhibitor Pigment or additive/coating | Service life of Coating (hours) | $E_i$ % |
|---|---|---|---|
| 1. | Trithiocyanuric acid-di-cyclohexykamine, 1:1 salt and Sr-doped amorphous silica mixture, as described by the test primer in table 16 (Ex. 16). | 3000 | 87 |
| 2. | Trithiocyanuric acid + Sr- doped amorphous silica pigment grade mixture, as described by the test primer in table 15 (Ex. 15). | 2000 | 25 |
| 3. | $SrCrO_4$, as described by control A in table 15 (Ex. 15) | 1600 | 0 |
| 4. | Sr-doped amorphous silica, as described by control A in table 15 (Ex. 15). | 1000 | −37 |

The disclosed $E_i$ values indicate that, in comparison with Sr-doped amorphous silica, trithiocyanuric acid and trithiocyanuric acid-di-cyclohexylamine, 1:1 salt significantly extend the service life of the coatings. Trithiocyanuric acid extends the service life of coil coatings on galvanized steel by 100% over Sr-doped amorphous silica, and trithiocyanuric acid -di-cyclohexylamine, 1:1 salt, extends the service life by 200% over Sr-doped amorphous silica. Likewise, both compounds display better corrosion inhibitor performance than $SrCrO_4$, and more specifically trithiocyanuric acid -di-cyclohexylamine 1:1 salt. Also, Sr-doped amorphous silica, as expected, displayed significantly poorer inhibitor performance than $SrCrO_4$.

With no intent to limit the concept of the present invention, Examples 18-21 delineate procedures for synthesizing conductive polymers doped with DMTD and some of its derivatives. More specifically, in the following examples, procedures for synthesizing salts of polyaniline formed with as DMTD and $(DMTD)_2$ are presented.

Example 18

An inherently conductive polyaniline-phosphoric acid salt (symbolized by (PANI)-($H_3PO_4$) generic formula) which will form the basis for Examples 19 and 20, was synthesized according to the following procedure:

In an open beaker 9.4 g (0.1 moles) of aniline was added to 600 mL of intensively stirred cold water containing 8.5 g (0.086 moles) of $H_3PO_4$. Subsequently, 20 g of ammonium persulfate (as an aqueous solution of approximately 20% $(NH_4)_2S_2O_8$)) was added into the system and the conditions were maintained for three (3) hours. The polymerization process resulted in an aqueous suspension of a finely divided dark green polyaniline salt. The salt also formed a thin coating on the equipment in contact with the reaction medium, which will cause a reduction in the measured yield.

The dispersed phase was separated by filtration, washed to a salt contaminant-free condition, subsequently dried at approximately 70° C. overnight, and pulverized. The characteristics of the conductive polymer were recorded, as shown in Table 18 and FIG. 9.

In order to assess its conductivity, a small sample of the polyaniline was pelletized at 2000 psi. When measured at two contact points, the polyaniline was found conductive as shown in Table 18 (see bulk conductivity).

TABLE 18

| | |
|---|---|
| Appearance | Dark green powder |
| Bulk Conductivity, (siemens/cm) | $\sim 1.6 \times 10^{-4}$ |
| Specific Gravity | 1.5 |

TABLE 18-continued

| | |
|---|---|
| pH, in saturated leachet | 2.2 |
| Yield | 7.6 g |

Example 19

Without being separated, the suspended conductive polyaniline salt from Example 18 was de-protonated by adjusting the pH of the aqueous phase to between 9 and 10 and maintaining the same pH under agitation for two (2) hours. The pH was adjusted by adding either diluted $NH_4OH$ or diluted NaOH. The resultant polyaniline base (emeraldine base, symbolized by (PANI) generic formula) was dark blue in color and it was found to be non-conductive following the procedure described in Example 18.

Subsequently, the dispersed polyaniline base was separated by filtration, washed with water to a soluble salt contaminant-free condition, and re-dispersed into 200 mL water by intense agitation. The pH of the resultant suspension was measured at 7.7.

Relevant IR spectrum is presented in FIG. 10.

Example 20

The polyaniline base from Example 19 was used to produce a DMTD salt of polyaniline symbolized by (PANI)-(DMTD) generic formula. It was produced by re-protonating the polyaniline base with DMTD according to the following procedure:

10.0 g (0.06 moles) of purified and finely ground DMTD, in 300 mL water, was added into the polyaniline base suspension from Example 19. The re-protonation process was completed by extensively stirring the suspension for twelve (12) hours at 40-50° C. At that time, the pH of the aqueous phase was measured to be 3.2.

The dispersed phase was separated by filtration, washed to a soluble contaminant-free condition, subsequently dried at approximately 70° C. overnight, pulverized, and then the characteristics of the conductive polymer were recorded, as shown in Table 20. Relevant IR spectrum is presented in FIG. 11.

TABLE 20

| | |
|---|---|
| Appearance | Dark green powder |
| Bulk Conductivity, siemens/cm | $1.6 \times 10^{-3}$ |
| Specific Gravity | 1.7 |
| pH, in saturated leachet | 2.3 |
| Yield | 17.8g |

Example 21

A polyaniline-$(DMTD)_2$ salt, symbolized by (PANI)-$(DMTD)_2$ generic formula, was synthesized according to the following procedure.

In an open beaker, 9.4 g (0.1 moles) of aniline (99% purity) was added to 600 mL intensively stirred cold water. Following this, 9.5 g (0.03 moles) of $(DMTD)_2$ was gradually introduced into the beaker. Subsequently, 20 g of ammonium persulfate (as an aqueous solution of approximately 20% $(NH_4)_2S_2O_8$)) was added into the system, and the same conditions were maintained for six (6) hours. The polymerization process resulted in an aqueous suspension of finely divided dark green solid and the pH of the aqueous phase was measured at 2.4.

The resultant polyaniline-$(DMTD)_2$ salt was separated by filtration, washed with water to a soluble contaminant-free condition, dried overnight at approximately 70° C. then pulverized, and its properties were recorded. The results may be seen below in Table 21 and the relevant IR spectrum may be seen in FIG. 12.

TABLE 21

| | |
|---|---|
| Appearance | Dark green powder |
| Bulk conductivity, siemens/cm | $3.3 \times 10^{-5}$ |
| Specific Gravity | 1.85 |
| pH, in saturated leachet | 2.5 |
| Yield | 14.7 g |

Example 22

With no intent to limit the concept of the present invention, this example discloses a synthesis process where DMTD is integrated into a complex inorganic matrix comprising additional corrosion inhibitor species, and specifically Ce(III), Zn(II) and molybdate species. It will be apparent to one skilled in the art that the specific composition of the complex inorganic matrix can be varied as a function of the chemical identity of precursors, as well as a function of the chosen stoichiometrical ratios.

A pigment grade corrosion inhibitor of $Ce_2(MoO_4)_3/Ce_2(CO_3)_3/1.46\ Zn(DMTD)_2$ generic composition was synthesized in a "one step" process involving the anticipated reactions, based upon the products' solubilities, as follow:

$$0.22ZnO+0.31Ce_2(CO_3)_3+0.47MoO_3.H_2O+0.44\ DMTD \rightarrow 0.15Ce_2(MoO_4)_3+0.22Zn(DMTD)_2+0.16Ce_2(CO_3)_3+0.45CO_2+0.67H_2O$$

In practice, the synthesis was carried out as disclosed below:

A mixed dispersion, consisting of 145 g (0.31 moles) of finely ground technical grade $Ce_2(CO_3)_3$ and 18 g (0.22 moles) of high quality ZnO in 600 ml water, was prepared by intense stirring for one hour at ambient temperature. Concurrently, a distinct mixed dispersion, containing 68 g (0.47 moles) of finely ground $MoO_3$ and 66 g (0.44 moles) of DMTD in 500 ml water, was also prepared in identical fashion.

After combining the two dispersions, the reaction mixture was heated to 60-65° C. under intense stirring. The synthesis process was finalized by maintaining the same conditions for about 12 hours. Subsequently, the resulted solid phase was separated by filtration, dried at 70° C. overnight, pulverized and characterized.

Quality parameter values and relevant IR spectrum are presented in Table 22 and FIG. 13, respectively.

TABLE 22

| | |
|---|---|
| Appearance | yellow powder |
| specific gravity | 3.34 |
| pH, in saturated leachate | 4.9 |
| Oil absorption, lb/100 lb | 36 |
| $Zn(DMTD)_2$, % (calculated) | ~29 |
| Yield, g | 266 |

The yield and the IR spectrum essentially confirm the anticipated generic composition specified above.

What is claimed is:

1. A process for protecting an aluminum substrate or a steel substrate against corrosion comprising:

providing an aluminum surface to be protected, applying to said surface a protective composition comprising of a pigment grade corrosion inhibitor composition, said protective composition being formed by reacting an organic compound from a group consisting of di-mercapto and poly-mercapto derivatives and their derivatives, with a cationic species selected from a group consisting of Bi(III), Co(II), Cd(II), Ag(I), Sb(III), Ni(II), Li(I), La(III), and Pr(III), said [protective] *pigment grade* corrosion inhibitor composition having a limited solubility in water of between about 0.01 and about 1000 mmoles/per liter of water, whereby said *pigment grade* corrosion inhibitor *composition* is capable of preventing corrosion for at least 2000 hours in salt spray exposure conditions.

2. A process according to claim 1 wherein said protective composition is applied as a layer of less than approximately 20 microns in thickness.

3. A process according to claim 1 wherein said protective composition has a limited solubility in water of between about 0.1 and about 10 mmoles/ liter.

4. A process according to claim 1 wherein said protective composition is applied as an aqueous solution and is subsequently dried whereby a conversion coating is formed on said substrate, said conversion coating being subsequently coated with a paint.

5. A process according to claim 1 wherein said protective composition is incorporated into a silane-based gel coating.

6. A process according to claim 1 wherein said protective corrosion inhibitor composition is selected from the group consisting of 2,5-dimercapro-1,3,4 thiadiazole or (DMTD), 2,4-dimercapto-s-triazolo-[4,3-b]-1,3-4-thiadiazole, trithiocyanuric acid or (TMT), derivatives of DMTD, and derivatives of TMT, dithiocyanuric acid, dimercaptopyridine, 2,4-dithiohydantoine, and 2,4-dimercapto-6-amino-5-triazine.

7. A process according to claim 1 wherein said [protective composition] *pigment grade corrosion inhibitor composition* is selected from the group consisting of $M(DMTD)_n$ where n=1,2 or 3, and M is a metal cation selected from the group consisting of Bi, Co, Ni, Cd, Ag, Sb, Li, La, Pr; alkyl ammonium salts of DMTD and $(DMTD)_n$; cyclo-alkyl ammonium salts of DMTD and $(DMTD)_n$; di-cyclo alkyl ammonium salts of DMTD and $(DMTD)_n$; aryl ammonium salts of DMTD; aryl ammonium salts of $(DMTD)_n$; quaternary ammonium salts of DMTD; quaternary ammonium salts of $(DMTD)_n$; polyaniline, polythiophen, and polypyrrol doped with DMTD; polyaniline, polythiophen, and polypyrrol doped with $(DMTD)_2$; and micro and nano composites of poly DMTD/polyaniline, DMTD/polythiophen and poly DMTD/polypyrrol.

8. A process according to claim 1 wherein said protective composition is applied by incorporating the same in a curable polymeric coating composition and applying said composition over said substrate.

9. A process according to claim 1 wherein said [protective composition] *pigment grade corrosion inhibitor composition* is selected from the group consisting of: N- or S- and N-, N-, S- and N-, S-substituted derivatives of DMTD [such as], 5-mercapto-3-phenyl-1,3,4-thiadiazoline-2-thione (Bismuthiol II), substituted derivatives of 5,5' dithio-bis(1,3,4 thiadiazole-2(3H)-thione $(DMTD)_2$, substituted derivatives of 5,5'-Thiobis (1,3,4-thiadiazole-2(3H)-thione substituted derivatives of dimercaptopyridine, and of 2,4-dithiohydantoine, substituted derivatives of 2,4-dimercapto-6-amino-5-triazine and $(DMTD)_n$, a polymer of DMTD; a salt of DMTD of general formula, $M(DMTD)_n$, where n=1,2 or 3, and M is a metal cation and M=Bi, Co, Ni, Cd, Ag, Sb, Li, La, Pr; a salt of $(DMTD)_n$ of general formula $M[(DMTD)_n]_m$, where n=2 or n>2, m=1,2, or 3 and M=Bi, Co, Ni, Cd, Ag, Sb, Li, La, Pr; alkyl ammonium salts of DMTD and $(DMTD)_n$; cyclo-alkyl ammonium salts of DMTD and $(DMTD)_n$; di-cyclo alkyl ammonium salts of DMTD and $(DMTD)_n$; aryl ammonium salts of DMTD and $(DMTD)_n$; quaternary ammonium salts of DMTD and $(DMTD)_n$; polyammonium salts of DMTD and $(DMTD)_n$ formed with a polyamine; polyaniline, polypyrrole and polythiophen doped with DMTD; polyaniline, polypyrrole and polythiophen doped with $(DMTD)_2$; micro and nano composites of poly DMTD/polyaniline, poly DMTD/polypyrrole, and poly DMTD/polythiophen; DMTD, salts of DMTD, and derivatives of DMTD, as constituents of an inorganic matrix; and a combination of said forms.

10. A process according to claim 1 wherein said [protective composition] *pigment grade corrosion inhibitor composition* is selected from the group consisting of:

S-substituted derivatives of trithiocyanuric acid (TMT); a salt of TMT of general formula, $M(TMT)_n$, where n=1,2 or 3, and M is a metal cation and M=Bi, Go, Ni, Cd, Ag, Sb, Li, La, Pr; alkyl ammonium salts of TMT; cyclo-alkyl ammonium salts of TMT; dicyclo alkyl ammonium salts of TMT; aryl ammonium salts of TMT; quaternary ammonium salts of TMT; polyamines formed with TMT; polyaniline doped with TMT; polypyrrole and polythiophen doped with TMT; micro and nano composites of poly TMT/polyaniline, poly TMT/ polypyrrole, and poly TMT/polythiophen; TMT, salts of TMT; and derivatives of TMT, as constituents of an inorganic matrix; salts of TMT and derivatives of TMT in encapsulated form in a polymer matrix, or as a cyclodextrin-inclusion compound; and a combination of said forms.

11. The protective composition of claim 1 wherein the protective composition is used in a paint.

*12. A process for producing a pigment grade corrosion inhibitor composition comprising the steps of:*

*providing a first aqueous slurry containing zinc oxide (ZnO);*

*providing an aqueous suspension containing 2,5-dimercapto-1,3,4 thiadiazole or (DMTD); and*

*transferring said aqueous suspension to said aqueous slurry;*

*wherein the ZnO and DMTD are added in a 1:2 stoichiometrical relationship of ZnO and DMTD.*

*13. The process according to claim 12 further comprising the steps of:*

*separating the solid phase out of the resulting slurry; and drying the solid phase.*

* * * * *